US011983530B2

(12) United States Patent
Nagi et al.

(10) Patent No.: US 11,983,530 B2
(45) Date of Patent: May 14, 2024

(54) RECONFIGURABLE DIGITAL SIGNAL PROCESSING (DSP) VECTOR ENGINE

(71) Applicant: Intel Corporation, Santa Clara, CA (US)

(72) Inventors: Sumeet Singh Nagi, Los Angeles, CA (US); Farhana Sheikh, Portland, OR (US); Scott Jeremy Weber, Piedmont, CA (US); Uneeb Yaqub Rathore, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 899 days.

(21) Appl. No.: 16/833,164

(22) Filed: Mar. 27, 2020

(65) Prior Publication Data
US 2020/0225947 A1 Jul. 16, 2020

(51) Int. Cl.
*G06F 9/30* (2018.01)
*G06F 7/48* (2006.01)
*G06F 7/49* (2006.01)
*G06F 7/50* (2006.01)
*G06F 7/523* (2006.01)
(Continued)

(52) U.S. Cl.
CPC .......... *G06F 9/3001* (2013.01); *G06F 7/4806* (2013.01); *G06F 7/49* (2013.01); *G06F 7/50* (2013.01); *G06F 7/523* (2013.01); *G06F 9/5027* (2013.01); *G06F 17/16* (2013.01)

(58) Field of Classification Search
CPC ........ G06F 9/3001; G06F 7/4806; G06F 7/49; G06F 7/50; G06F 7/523; G06F 9/5027; G06F 17/16; G06F 2207/3812; G06F 7/5443; G06F 2207/4824; G06F 17/142
See application file for complete search history.

(56) References Cited

U.S. PATENT DOCUMENTS

| | | | | | |
|---|---|---|---|---|---|
| 4,996,661 | A | * | 2/1991 | Cox | ........................ G06F 7/483 708/514 |
| 6,055,556 | A | * | 4/2000 | Barak | ...................... G06F 17/16 708/622 |

(Continued)

FOREIGN PATENT DOCUMENTS

| | | | | |
|---|---|---|---|---|
| EP | 1566730 A1 | * | 8/2005 | ........... G06F 7/5324 |
| EP | 1566730 A1 | | 8/2005 | |

OTHER PUBLICATIONS

N. P. Jouppi et al., "In-datacenter performance analysis of a tensor processing unit," 2017 ACM/IEEE 44th Annual International Symposium on Computer Architecture (ISCA), Toronto, ON, 2017, pp. 1-12. doi: 10.1145/3079856.3080246.

(Continued)

*Primary Examiner* — Farley Abad
(74) *Attorney, Agent, or Firm* — Akona IP PC

(57) ABSTRACT

Systems and methods described herein may relate to providing a dynamically configurable circuitry able to process data associated with a variety of matrix dimensions using one or more complex number operations, one or more real number operations, or both. Configurations may be applied to the configurable circuitry to program the configurable circuitry for a next operation. The configurable circuitry may process data according to a variety of operations based at least in part on operation of a repeated processing element coupled in a compute network of processing elements.

20 Claims, 31 Drawing Sheets

(51) Int. Cl.
*G06F 9/50* (2006.01)
*G06F 17/16* (2006.01)

(56) References Cited

U.S. PATENT DOCUMENTS

| | | | | |
|---|---|---|---|---|
| 6,208,946 | B1* | 3/2001 | Arakawa | G01R 23/16 |
| | | | | 702/77 |
| 2003/0154357 | A1* | 8/2003 | Master | G06F 15/7867 |
| | | | | 712/15 |
| 2004/0018711 | A1* | 1/2004 | Madurawe | H01L 21/44 |
| | | | | 438/599 |
| 2008/0155002 | A1* | 6/2008 | Janczak | G06F 17/142 |
| | | | | 708/404 |
| 2013/0151822 | A1* | 6/2013 | Eichenberger | G06F 9/30072 |
| | | | | 712/234 |
| 2014/0032626 | A1* | 1/2014 | Jarboe | G06F 7/4812 |
| | | | | 708/622 |
| 2015/0236881 | A1* | 8/2015 | Xiao | G06F 17/142 |
| | | | | 370/210 |
| 2018/0088906 | A1 | 3/2018 | Langhammer | |
| 2018/0159786 | A1* | 6/2018 | Rowlands | H04L 49/109 |
| 2019/0109590 | A1* | 4/2019 | More | H03K 17/007 |
| 2020/0319296 | A1* | 10/2020 | Gupta | G01S 7/352 |
| 2021/0056446 | A1* | 2/2021 | Dally | G06N 3/045 |

OTHER PUBLICATIONS

Nvidia Tesla V100 GPU Architecture; http://images.nvidia.com/content/volta-architecture/pdf/volta-architecture-whitepaper.pdf; Aug. 2017; 58 pages.

Xilinx; "Versal: The First Adaptive Compute Acceleration Platform (ACAP)," https://www.xilinx.com/support/documentation/white_papers/wp505-versal-acap.pdf; Sep. 23, 2019; 21 pages.

K. He, X. Zhang, S. Ren and J. Sun, "Deep Residual Learning for Image Recognition," 2016 IEEE Conference on Computer Vision and Pattern Recognition (CVPR), Las Vegas, NV, 2016, pp. 770-778. doi: 10.1109/CVPR.2016.90.

Y. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379. doi: 10.1109/ISCA.2016.40.

Extended European Search Report for EP 20207770.7 dated May 3, 2021.

* cited by examiner

RECONFIGURABLE DIGITAL SIGNAL PROCESSING (DSP) VECTOR ENGINE

BACKGROUND

The present disclosure relates generally to signal processing devices for integrated circuit devices and, more particularly, digital signal processing vector engines that may flexibly support different matrix sizes, especially matrices used in machine learning (ML) and/or artificial intelligence (AI) applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Advances in microelectronics have enabled the continued increase in transistor densities and bandwidths for a variety of integrated circuit devices and communication techniques. Indeed, some advanced integrated circuits, such as field programmable gate arrays (FPGAs) or other programmable logic devices, may include large number of transistors that enable an increasingly wide variety of programmable circuit designs to be programmed into programmable fabric for implementation of a large number of different functions. In some cases, data generated by the functions may be packetized and routed to or from other devices to execute an operation or to communicate results of an operation. However, since a circuit design for a programmable logic device may not be known in advance, processing interfaces unable to accommodate a variety of data transmission widths or processing operations may be unable to accommodate certain data transmission or analysis operations when programmable logic device performs operations to generate or use data having different data widths.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

Figure 1:
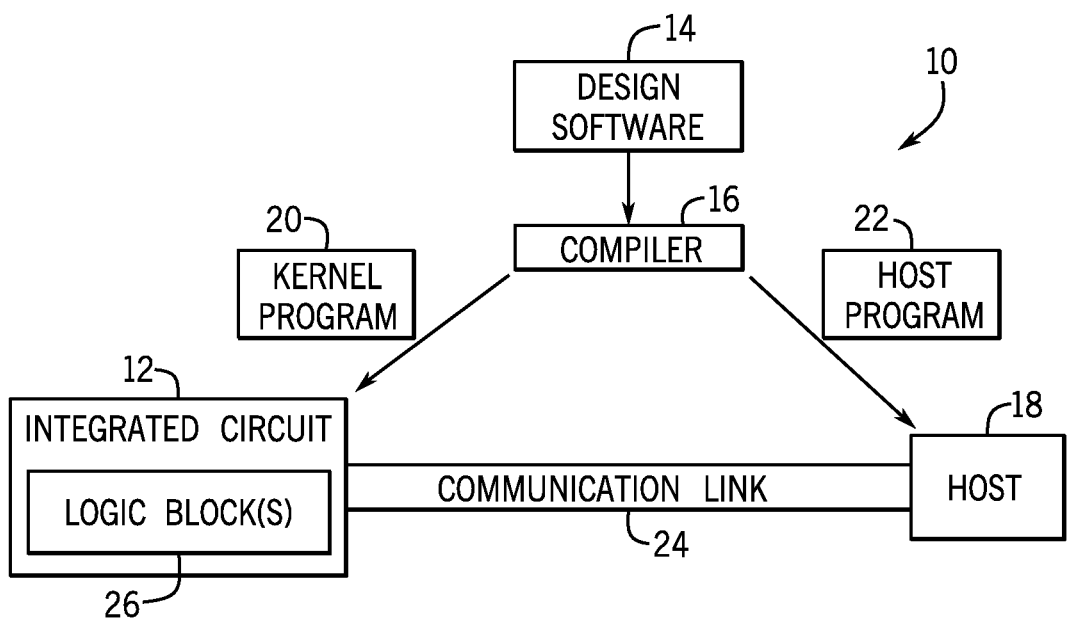
FIG. 1 is a block diagram of a system for implementing arithmetic operations, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. The techniques presented and claimed herein are referenced and applied to material objects and concrete examples of a practical nature that demonstrably improve the present technical field and, as such, are not abstract, intangible or purely theoretical.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical exclusive-OR (XOR)). In other words, the phrase A "or" B is intended to mean A, B, or both A and B.

Machine Learning (ML) technologies, machine intelligence technologies (e.g., Artificial Intelligence (AI) technologies, and high-throughput communication technologies (e.g., Fifth Generation (5G) technologies) increasingly permeate everyday life and are converging to provide ubiquitous intelligent wireless services. As communication technologies begin to provide greater throughput, higher data bandwidths, and lower latencies, a desire for gigahertz (GHz) performance in digital signal processing (DSP) circuitry of a system may increase. In addition, as technologies increasingly use relatively higher performance computations at an edge (e.g., input or output) of a system, accelerated performance of related computations may also be desired to be used within the system.

To perform this processing, processing burdens may be divided among parallel compute engines. However, compute requirements for digital signal processing and neural network processing may be different. Indeed, it may be advantageous to include processing components capable of performing digital signal processing and neural network processing in a single configurable platform. Both technologies may benefit from using a parallel processor to perform computations. However, sharing a processor between the systems may be complex since compute requirements for high-speed digital signal processing and ML/AI algorithms may be different. A single platform that performs a wide variety of digital signal processing and neural network processing may lead to system improvements, such as acceleration of wireless signal processing operations based on machine learning (ML) and/or artificial intelligence (AI) computations.

For example, ML algorithms supported by ML systems may have high memory bandwidth systems specifications to be met and may support low bit width data types. ML algorithms may use real number arithmetic. High-speed digital signal processing, as used by high-throughput communication technologies, may use line rate processing and high bit width data. It is noted that line rate processing refers to real-time operations. For example, when input data arrives from an analog-to-digital converter (ADC) at 640 Gigabytes-per-second (Gbps), real-time operations (or line rate operations or line rate processing) means that the input data is to be processed at the same rate it arrives at, and is not to be buffered in memory before being processing. Digital signal processing may perform computations primarily in complex number form, and may not abide by the same line rate processing parameters.

In a system that performs ML-related computations and/or digital signal processing, it may be advantageous to use a single configurable platform to perform both processing operations, as opposed to having separate compute engines for ML-related computations and digital signal processing of signals (e.g., signals transmitted via wired or wireless couplings). This disclosure proposes a hardware architecture that may accelerate DSP algorithms and ML algorithms. Combining the processing into one device may improve power consumption of the system and reduce a footprint use to perform the processing in separate devices. Furthermore, a tight coupling of digital signal processing operations and ML-related operation may lead to acceleration of intelligent wireless signal processing algorithms based on ML approaches.

The circuitry discussed herein (e.g., integrated accumulator) may improve operations associated with convolutional neural networks (CNNs), residual neural networks (RNNs), and connected neural networks within a single hardware accelerator, or the like. This integrated accumulator may minimize latencies for any digital beamforming algorithm, Fast Fourier Transform (FFT), and/or ML/AI inferencing operations while reducing an amount of control hardware used to perform these operations when compared to other solutions. The flexible hardware architecture of the integrated accumulator may accommodate a variety of complex computations and/or real computations and may permit performance of any combination of matrix operation within a range of sizes (e.g., between a maximum size and a minimum size).

The integrated accumulator may execute multiple programs in parallel, including combinations of DSP operations and/or ML operations. Execution of the multiple programs in parallel may occur in a real-time and/or streaming manner. The integrated accumulator may also provide a configurable boundary between DSP operation acceleration and ML operation acceleration. The integrated accumulator may also be co-packaged with an advanced FPGA system through 2.5D integration using an Advanced Interface Bus (AM), an Embedded Multi-die Interconnect Bridge (EMIB), or the like.

With the foregoing in mind, FIG. 1 illustrates a block diagram of a system 10 that may implement arithmetic operations. A designer may desire to implement functionality, such as the arithmetic operations of this disclosure, on an integrated circuit 12 (e.g., a programmable logic device such as a field-programmable gate array (FPGA) or an application-specific integrated circuit (ASIC)). In some cases, the designer may specify a high-level program to be implemented, such as an OpenCL program, which may enable the designer to more efficiently and easily provide programming instructions to configure a set of programmable logic cells for the integrated circuit 12 without specific knowledge of low-level hardware description languages (e.g., Verilog or VHDL). For example, since OpenCL is quite similar to other high-level programming languages, such as C++, designers of programmable logic familiar with such programming languages may have a reduced learning curve than designers that are required to learn unfamiliar low-level hardware description languages to implement new functionalities in the integrated circuit 12.

The designer may implement their high-level designs using design software 14, such as a version of Intel® Quartus® by INTEL CORPORATION. The design software 14 may use a compiler 16 to convert the high-level program into a lower-level description. The compiler 16 may provide machine-readable instructions representative of the high-level program to a host 18 and the integrated circuit 12. The host 18 may receive a host program 22 which may be implemented by the kernel programs 20. To implement the host program 22, the host 18 may communicate instructions from the host program 22 to the integrated circuit 12 via a communications link 24, which may be, for example, direct memory access (DMA) communications or peripheral component interconnect express (PCIe) communications. In some embodiments, the kernel programs 20 and the host 18 may enable configuration of a logic block 26 on the integrated circuit 12. The logic block 26 may include circuitry and/or other logic elements and may be configured to implement arithmetic operations, such as addition and multiplication.

The designer may use the design software 14 to generate and/or to specify a low-level program, such as the low-level hardware description languages described above. Further, in some embodiments, the system 10 may be implemented without a separate host program 22. Moreover, in some embodiments, the techniques described herein may be implemented in circuitry as a non-programmable circuit design. Thus, embodiments described herein are intended to be illustrative and not limiting.

Figure 2:
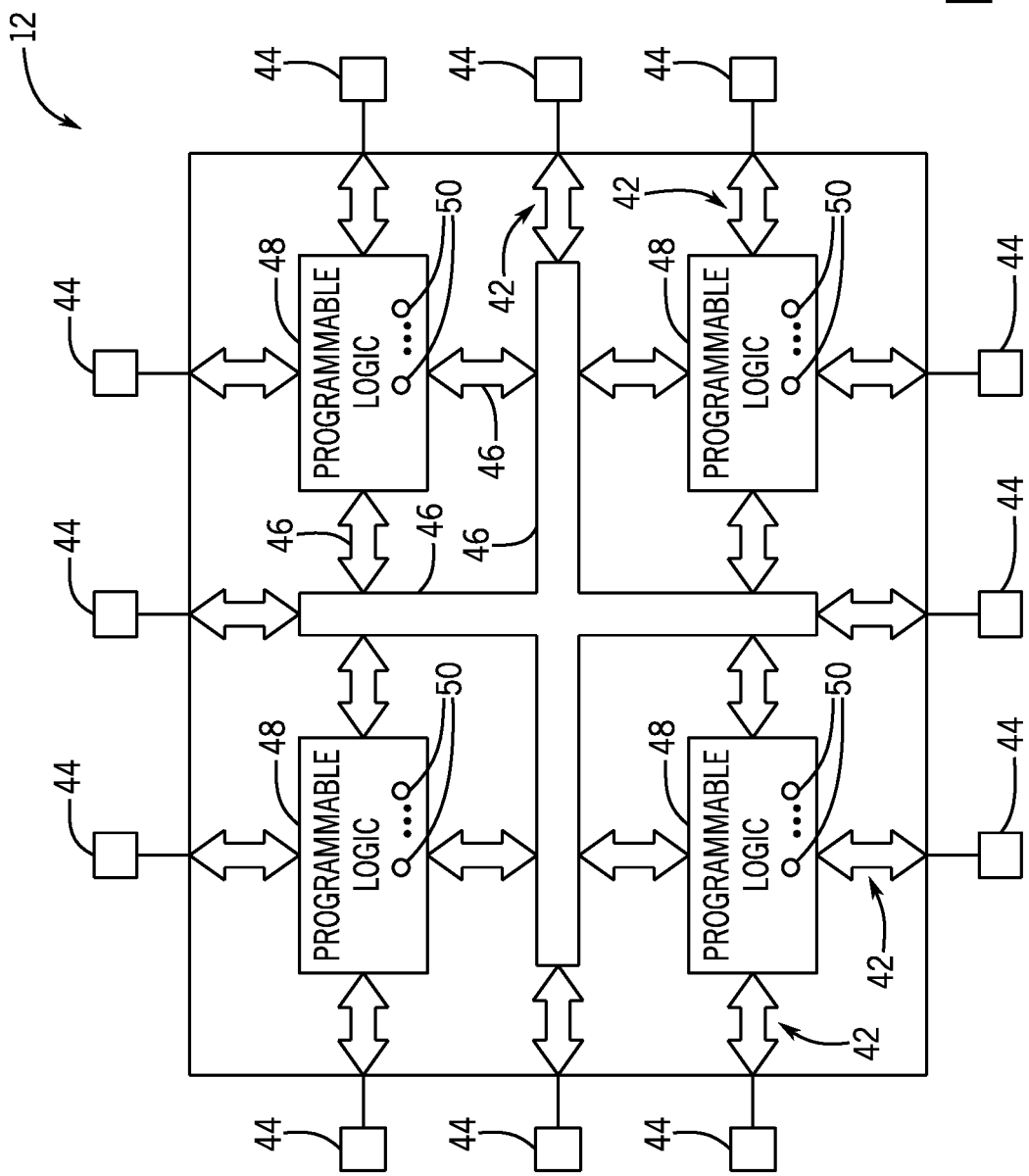
FIG. 2 is a block diagram of the integrated circuit system of FIG. 1 programmed by the computing system of FIG. 1, in accordance with an embodiment.

Turning now to a more detailed discussion of the integrated circuit 12, FIG. 2 is a block diagram of an example of the integrated circuit 12 as a programmable logic device, such as a field-programmable gate array (FPGA). Further, it should be understood that the integrated circuit 12 may be any other suitable type of programmable logic device (e.g., an ASIC and/or application-specific standard product). As shown, integrated circuit 12 may have input/output circuitry 42 for driving signals off device and for receiving signals from other devices via input/output pins 44. Interconnection resources 46, such as global and local vertical and horizontal conductive lines and buses, may be used to route signals on integrated circuit 12. Additionally, interconnection resources 46 may include fixed interconnects (conductive lines) and programmable interconnects (i.e., programmable connections between respective fixed interconnects). Programmable logic 48 may include combinational and sequential logic circuitry. For example, programmable logic 48 may include look-up tables, registers, and multiplexers. In various embodiments, the programmable logic 48 may be configured to perform a custom logic function. The programmable interconnects associated with interconnection resources may be considered to be a part of programmable logic 48.

Programmable logic devices, such as the integrated circuit 12, may include programmable elements 50 with the programmable logic 48. For example, as discussed above, a designer (e.g., a customer) may (re)program (e.g., (re)configure) the programmable logic 48 to perform one or more desired functions. By way of example, some programmable logic devices may be programmed or reprogrammed by configuring their programmable elements 50 using mask programming arrangements, which is performed during semiconductor manufacturing. Other programmable logic devices are configured after semiconductor fabrication operations have been completed, such as by using electrical programming or laser programming to program their programmable elements 50. In general, programmable elements 50 may be based on any suitable programmable technology, such as fuses, antifuses, electrically-programmable read-only-memory technology, random-access memory cells, mask-programmed elements, and so forth.

Many programmable logic devices are electrically programmed. With electrical programming arrangements, the programmable elements 50 may be formed from one or more memory cells. For example, during programming, configuration data is loaded into the memory cells using pins 44 and input/output circuitry 42. In one embodiment, the memory cells may be implemented as random-access-memory (RAM) cells. The use of memory cells based on RAM technology is described herein is intended to be only one example. Further, since these RAM cells are loaded with configuration data during programming, they are sometimes referred to as configuration RAM cells (CRAM). These memory cells may each provide a corresponding static control output signal that controls the state of an associated logic component in programmable logic 48. For instance, in some embodiments, the output signals may be applied to the gates of metal-oxide-semiconductor (MOS) transistors within the programmable logic 48.

Keeping the discussion of FIG. 1 and FIG. 2 in mind, a user (e.g., designer) may utilize the design software 14 to implement the logic block 26 on the programmable logic 48 of the integrated circuit 12. In particular, the designer may specify in a high-level program that mathematical operations such as addition and multiplication be performed. The compiler 16 may convert the high-level program into a lower-level description that is used to program the programmable logic 48 to perform addition.

Figure 3:
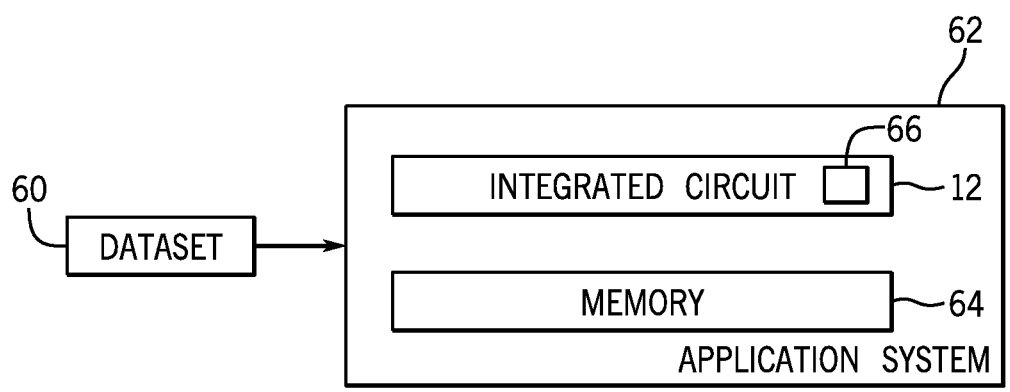
FIG. 3 is a block diagram of an application system that includes the integrated circuit of FIG. 1 and a memory, in accordance with an embodiment.

Once programmed, the integrated circuit 12 may process a dataset 60, as is shown in FIG. 3. FIG. 3 is a block diagram of an application system 62 that includes the integrated circuit 12 and memory 64. The application system 62 may represent a device that uses the integrated circuit 12 to perform operations based on computational results from the integrated circuit 12, or the like. The integrated circuit 12 may directly receive the dataset 60. The dataset 60 may be stored into the memory 64 before, during, or concurrent to transmission to the integrated circuit 12.

As bandwidths and processing expectations increase, such as in response to the advent of fifth generation (5G) and higher communication techniques and/or widespread use of neural networks (e.g., machine learning (ML) and/or artificial intelligence (AI) computations) to perform computations, the integrated circuit 12 may be expected to handle subsequent increases in size of the dataset 60 over time. Additionally or alternatively, the integrated circuit 12 may also be expected to perform digital signal processing operations of signals transmitted using 5G or higher techniques (e.g., signals of higher throughput and/or high data transmission bandwidths) and ML operations. A single platform, such as an integrated accumulator 66, that performs a wide variety of digital signal processing and neural network processing may lead to system improvements, such as acceleration of wireless signal processing operations based on machine learning (ML) and/or artificial intelligence (AI) computations.

Figure 4:
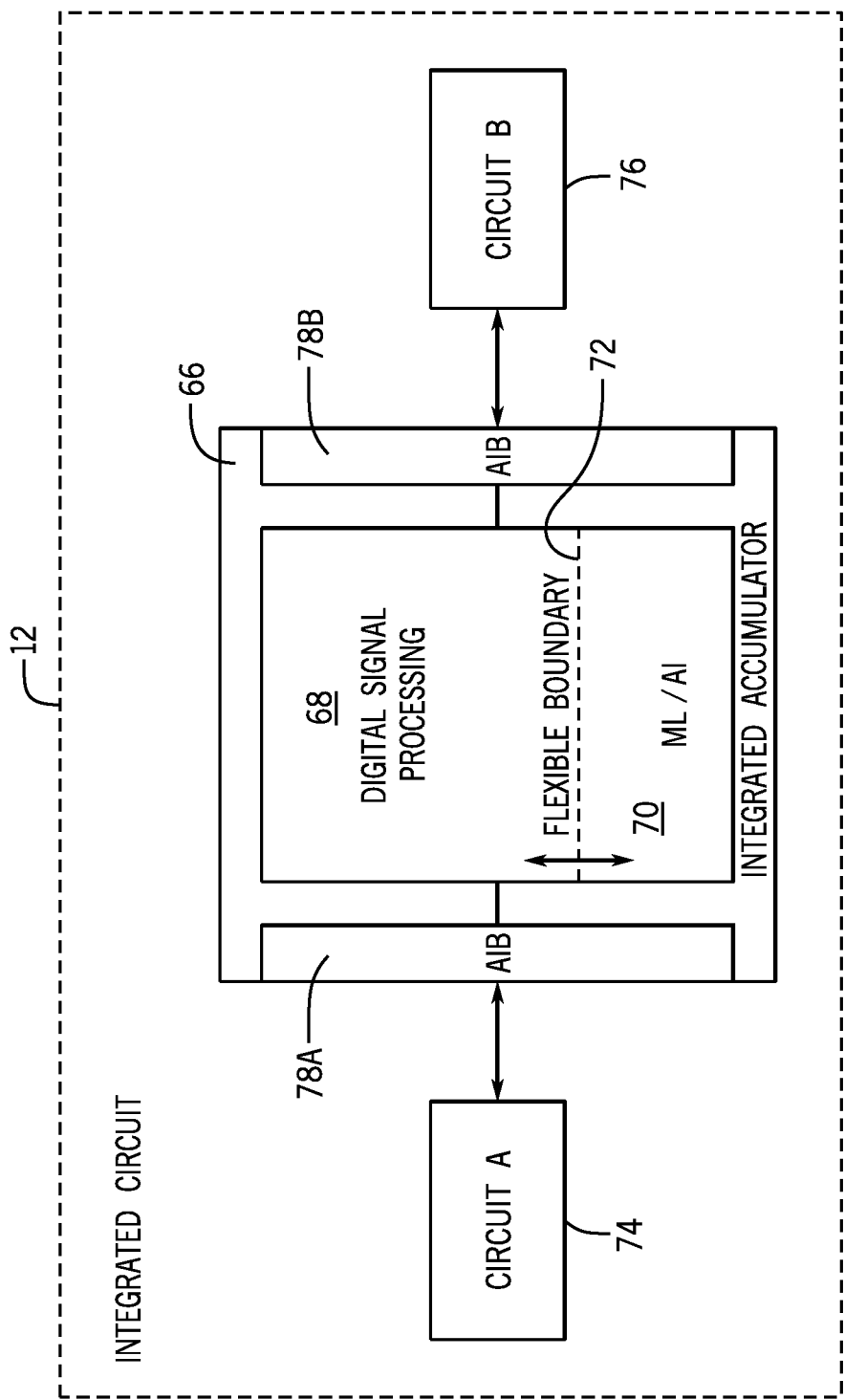
FIG. 4 is a block diagram of the integrated circuit of FIG. 1 and an example integrated accumulator, in accordance with an embodiment.

To elaborate, FIG. 4 is a block diagram of an example integrated circuit 12 that includes an example integrated accumulator 66. The integrated accumulator 66 may include circuitry configurable to perform digital signal processing (e.g., represented by portion 68) and/or to perform machine learning processing (e.g., represented by portion 70). A flexible boundary may separate portion 68 of the integrated accumulator 66 from the portion 70, meaning that the relative amounts of processing performed by each portion 68, 70 may be configurable, such as configurable or reconfigurable between operations. In this way, for a first computational load, the portion 68 may process relatively higher bandwidths of data than the portion 70, and for a second computational load, the portion 70 may process relatively higher bandwidths of data than the portion 68.

The integrated accumulator 66 may be coupled between a first circuit 74 of the integrated circuit 12 and between a second circuit 76 of the integrated circuit 12. The first circuit 74 and/or the second circuit 76 may be any suitable type of software or hardware, or a combination of the two, of the integrated circuit 12. In this way, the first circuit 74 and/or the second circuit 76 may be or include programmable logic 48, programmable elements 50, or the like, to enable one or more portions of the first circuit 74 and/or the second circuit 76 to be reprogrammable (e.g., reconfigurable). The integrated accumulator 66 may interface with the first circuit 74 and/or with the second circuit 76 using interface buses 78, such as an advanced interface bus (AIB) and/or an embedded multi-die interconnect bridge (EMIB).

Sometimes the dataset 60 is transmitted to the application system 62 for transmission between the first circuit 74 and the second circuit 76. As described above, the integrated accumulator 66 may be a reprogrammable circuitry capable of performing a multitude of tasks.

Figure 5:
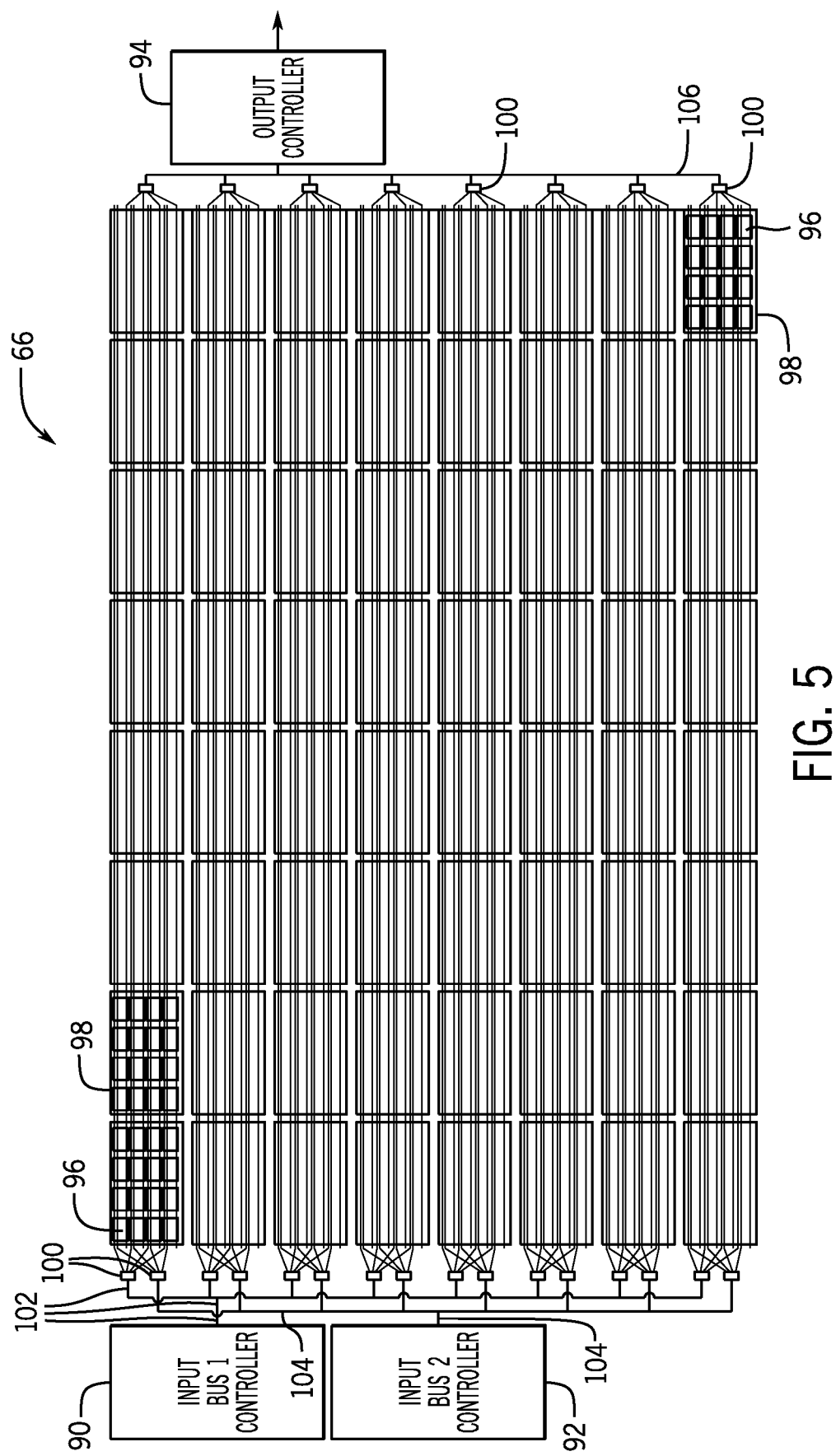
FIG. 5 is a block diagram of the integrated accumulator of FIG. 4, in accordance with an embodiment.

FIG. 5 is a block diagram of an example integrated accumulator 66. The integrated accumulator 66 may include one or more controllers, for example, a first input controller 90, a second input controller 92, and an output controller 94. The integrated accumulator 66 may include one or more processing elements 96 and one or more groups of processing elements (one or more PE groups) 98. In this example, one PE group 98 may include 16 processing elements 96 and the integrated accumulator 66 may include 64 PE groups. It is noted that any suitable number of PE groups 98 and/or any number of processing elements 96 may be included in the integrated accumulator 66.

The depicted example may support a [1×64]*[64×64] complex matrix multiplication operation, able to be performed each clock cycle, at a line rate with a between 15 nanoseconds [ns] and 25 ns (e.g., 20 ns). The integrated accumulator 66 may include any number of these blocks (e.g., processing elements 96, PE groups 98) operating in parallel with each other and be configurable depending on the size of matrix operation required or number of parallel programs running on the integrated accumulator 66. Furthermore, in some cases, when a respective processing element 96 and/or PE group 98 is idle, power to at least a portion of the processing element 96 and/or the PE group 98 may be reduced (e.g., lowered, reduced to zero).

Each controller (e.g., first input controller 90, second input controller 92, output controller 94) may couple via buses to each processing element 96, where routers 100 may be used to direct the transmission of data from the controllers to each processing element. For example, the first input controller 90 may cause transmission of data to a processing element via bus 102, the second input controller 92 may cause transmission of data to a processing element via bus 104, and the output controller 94 may cause transmission of data to a processing element via bus 106. The routers 100 may operate in response to control signals from respective of the controllers (e.g., first input controller 90, second input controller 92, output controller 94). To facilitate explanation of the integrated accumulator 66, discussion herein describes the operations of the processing elements 96, interconnections of the processing elements 96, and some example operations performable by the processing elements 96 (although more operations may be able to be performed), and the like.

Figure 6:
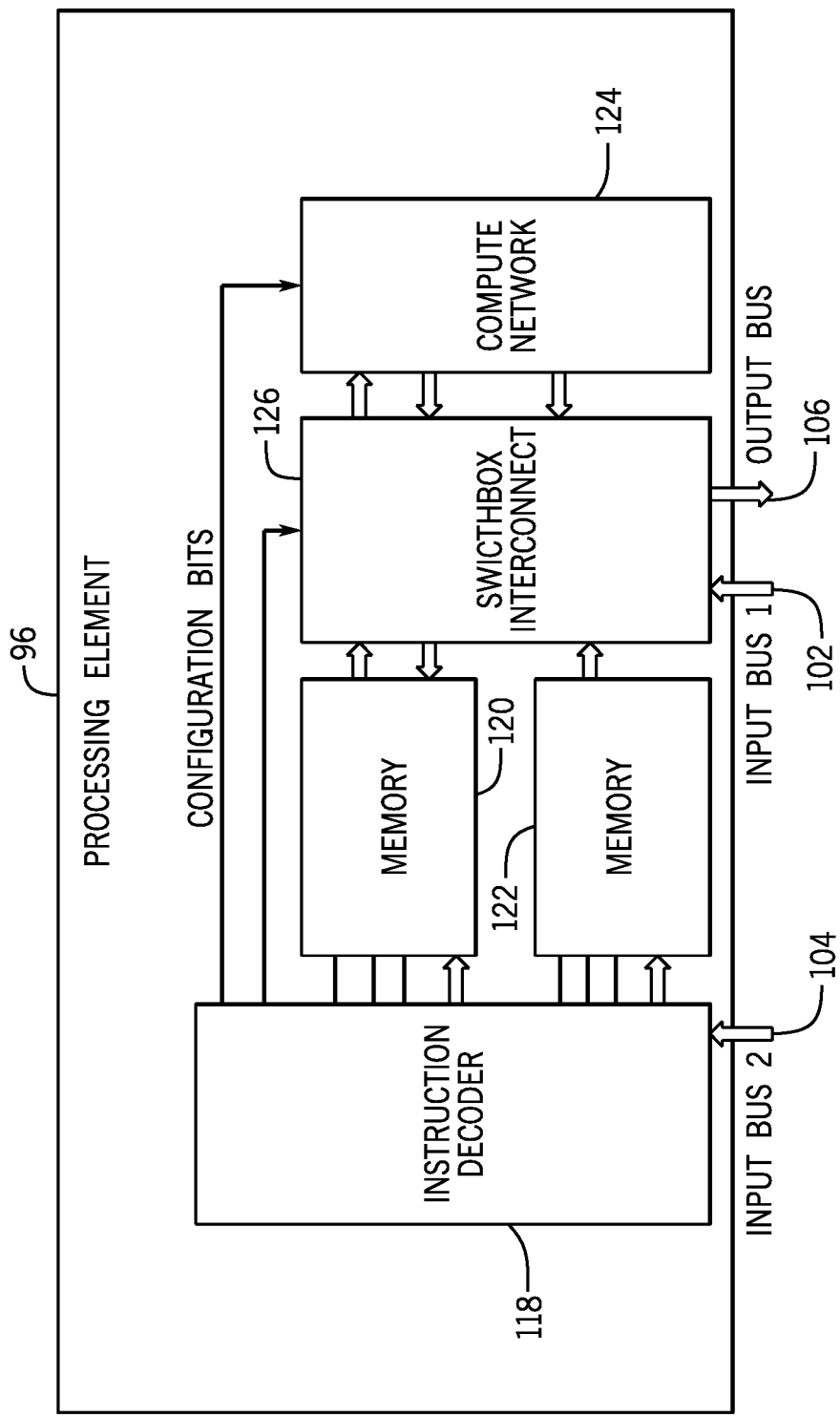
FIG. 6 is a block diagram of a processing element of the integrated accumulator of FIG. 4, in accordance with an embodiment.

Thus, to proceed, FIG. 6 is a block diagram of a processing element 96. It should be understood that this depiction of the processing element 96 should not be considered limiting, and that any suitable combination of circuitry may be included in the processing element 96. In this example, the bus 104 may provide data associated with the first input controller 90 to an instruction decoder 118. The instruction decoder 118 may control operations of the processing element 96. For example, the instruction decoder 118 may receive and decode an instruction (e.g., command) from the bus 104 (e.g., instruction bus) using an instruction bus switch, as will be appreciated. The decoded instruction may indicate to the instruction decoder 118 one or more operations for the processing element 96 to perform. In this way, the instruction decoder 118 may store and schedule operations to be processed at a corresponding clock cycle for the other circuitry of the processing element 96.

The processing element 96 may also include a first memory 120 and a second memory 122. The memory 120 and the memory 122 may be used to store weight matrices and an input matrix, where the processing element 96 is to process the input matrix based on the weight matrices. The use of two memories in the processing element 96 may improve processing operations since this two-memory element structure permits the processing element 96 to operate on matrix sizes larger than a bit width permitted by the bus 102, the bus 104, and/or the bus 106.

The memory 122 may store weights and output data of a same memory address each clock cycle, which may be useful for some applications, such as line rate streaming applications. The data may be stored in the memory address as a 256-bit wide word. However, in some cases, the processing element 96 may be programmed to output the upper 128-bits or lower 128-bits, such as to conserve power.

The processing element 96 may include a compute network 124. The compute network 124 includes the multipliers and adders of the processing element 96. The compute network 124 may perform the arithmetic operations of the processing element 96. The components of the compute network 124 may be arranged in such a way that permits reconfiguration of the components, and thus reprogramming of the mathematical operations performed by the compute network 124. The memory 120 may provide data to an "a" subset of inputs of the compute network 124, and the memory 122 may provide data to a "b" subset of inputs of the compute network 124.

A switchbox interconnect 126 may control configuration of inputs and outputs to and/or from the compute network 124. The switchbox interconnect 126 may include one or more switchboxes to perform the control the configuration. The compute network 124 may include repeating patterns of circuitry (e.g., circuitry units) that may be configured to perform operations, such as by defining which portions of the compute network 124 receive inputs, defining particular transmission paths through the compute network 124, weights applied to the different portions of the compute network 124, or the like.

Figure 7:
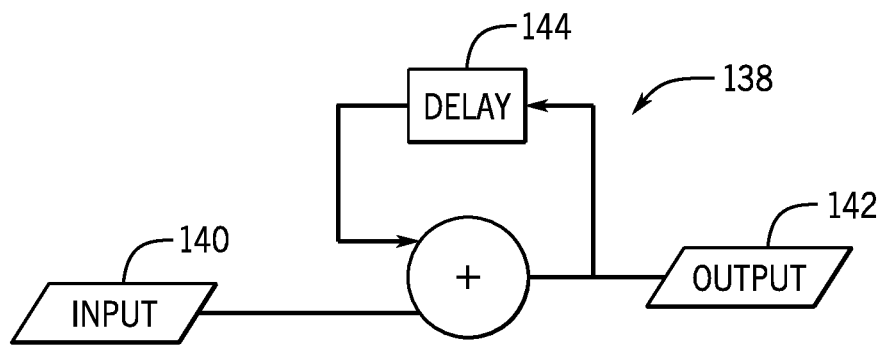
FIG. 7 is a block diagram of a first example accumulator, in accordance with an embodiment.

To elaborate further on the circuitry of the compute network 124, FIG. 7 is a block diagram of an example accumulator 138. The accumulator 138 may add an input 140 to its previous output 142 over time (e.g., represented by delay 144). This design of the accumulator 138 may process any size of input vector (e.g., data arranged in a vector as input 140). However, latency of the accumulation operation may increase with relatively larger sizes of the input vector. For example, a 16 element input vector (e.g., 16-bit) may take 16 clock cycles to accumulate, while a 32 element input vector may take 32 clock cycles to accumulate, thus representing a larger latency of accumulation operation. The accumulator 138 may not accumulate values each clock cycle.

Figure 8:
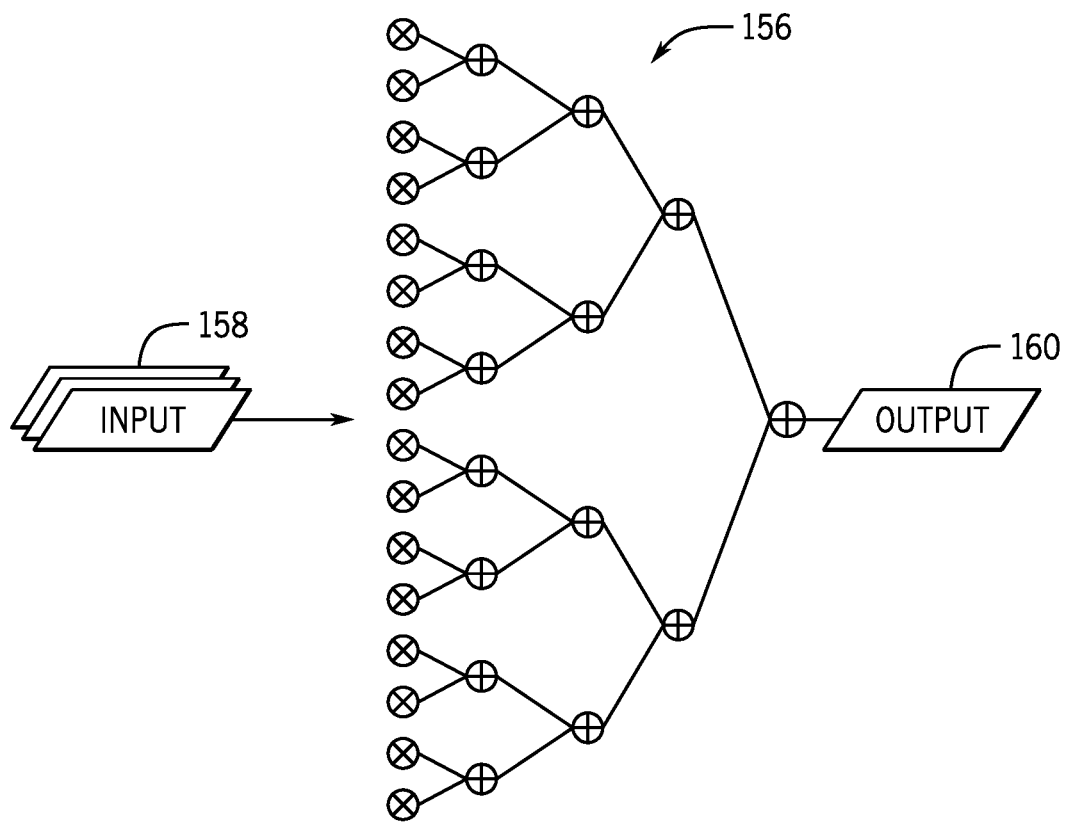
FIG. 8 is a block diagram of a second example accumulator, in accordance with an embodiment.

FIG. 8 is a block diagram of an example accumulator 156 that does accumulate values each clock cycle. The accumulator 156 may be a relatively faster architecture option than the accumulator 138 and may operate similar to a logarithmic adder tree. Inputs 158 to the accumulator 156 may be applied each clock cycle to generate output 160, providing the reduced latencies and relatively higher throughput.

Figure 9:
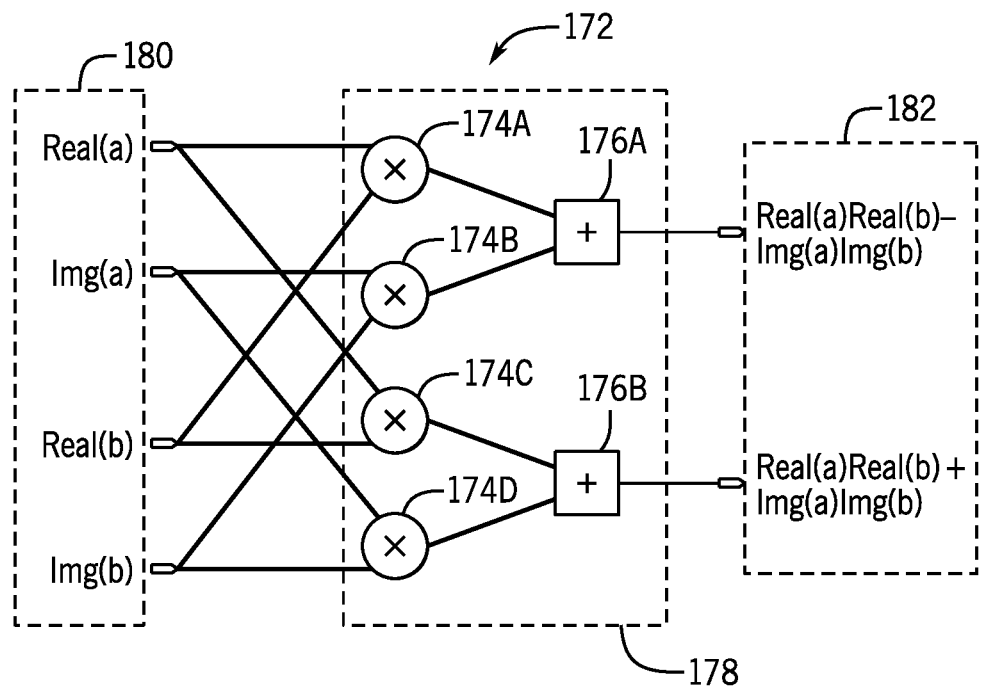
FIG. 9 is a block diagram of a third example accumulator that combines the first example accumulator of FIG. 7 and the second example accumulator of FIG. 8 to perform a complex number operation, in accordance with an embodiment.

Keeping the foregoing in mind, the compute network 124 may use a combination of the accumulator 138 and the accumulator 156 to process data provided to the processing element 96. FIG. 9 is a block diagram of an example accumulator 172 that combines the accumulator 138 and the accumulator 156. The accumulator 172 may perform complex multiplication and accumulation without reprogramming between performing the operation. This architecture is based on 4 multipliers 174, 2 adders 176, and complex multipliers 178.

The accumulator 172 may receive a combination of imaginary type data (e.g., Img(a) is an imaginary (or complex) type data version of data "a") and real type data (e.g., Real(a) is a real type data version of data "a") as inputs 180 to generate accumulated outputs 182 that includes imaginary type data (e.g., Img(a)Img(b)). The accumulator 172 may perform a complex multiply-accumulate (MAC) operation (e.g., a complex number operation) in response to receiving a combination of real type data and imaginary type data. The inputs 180 may be applied in a different combination to perform a real MAC operation using the same structure of the complex multiplier 178. By leveraging the complex multiplier 178 in the processing element 96, the processing element 96 may perform convolution operations, matrix multiplication operations, fast Fourier transform (FFT) operations, or any other arithmetic operation without reprogramming of the complex multiplier 178 between each operation, thereby improving deployment and/or application of these processing operations to application systems 62.

Figure 10:
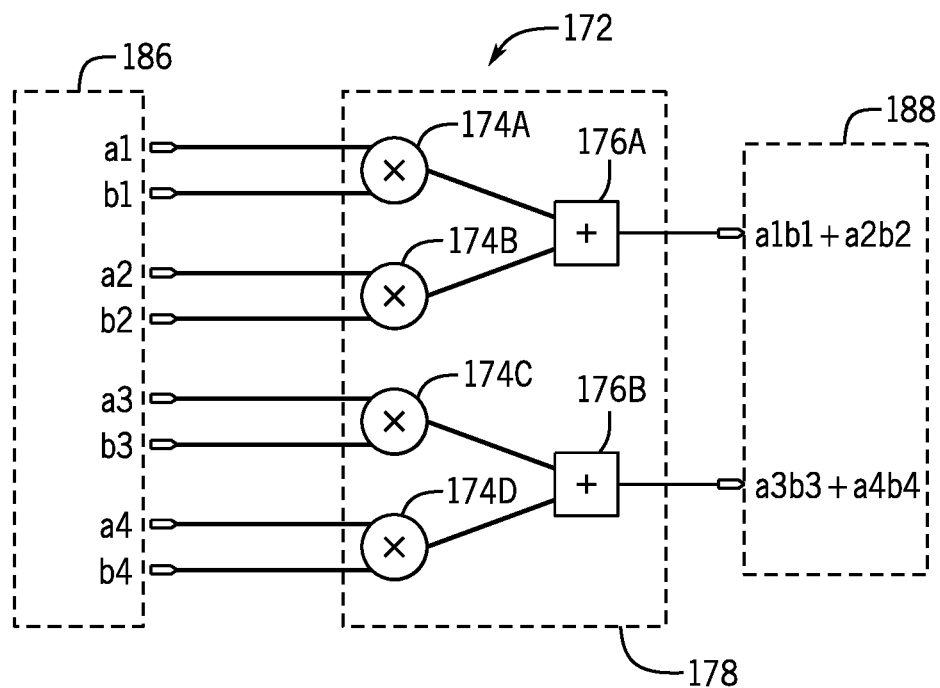
FIG. 10 is a block diagram of the example accumulator of FIG. 9 configured to perform a real number operation, in accordance with an embodiment.

To elaborate, FIG. 10 is a block diagram of the example accumulator 172 receiving inputs 186 suitable for performing a real MAC operation (e.g., a real number operation). The accumulator 172 is shown as performing a 2-element real vector MAC operation. The inputs 186 may each be real type data. Performing the real MAC operations may generate resulting data having a real type data as outputs 188. The accumulator 172 may be able to perform both real MAC operations and complex MAC operations without reprogramming of the complex multiplier 178 and in response to changing a data type and/or a combination of inputs transmitted to the complex multiplier 178 (e.g., changing the combination of data types of the inputs 180 to the real data type of inputs 186). One or more complex multipliers 178 may be combined to form the compute network 124 of FIG. 6.

Figure 11:
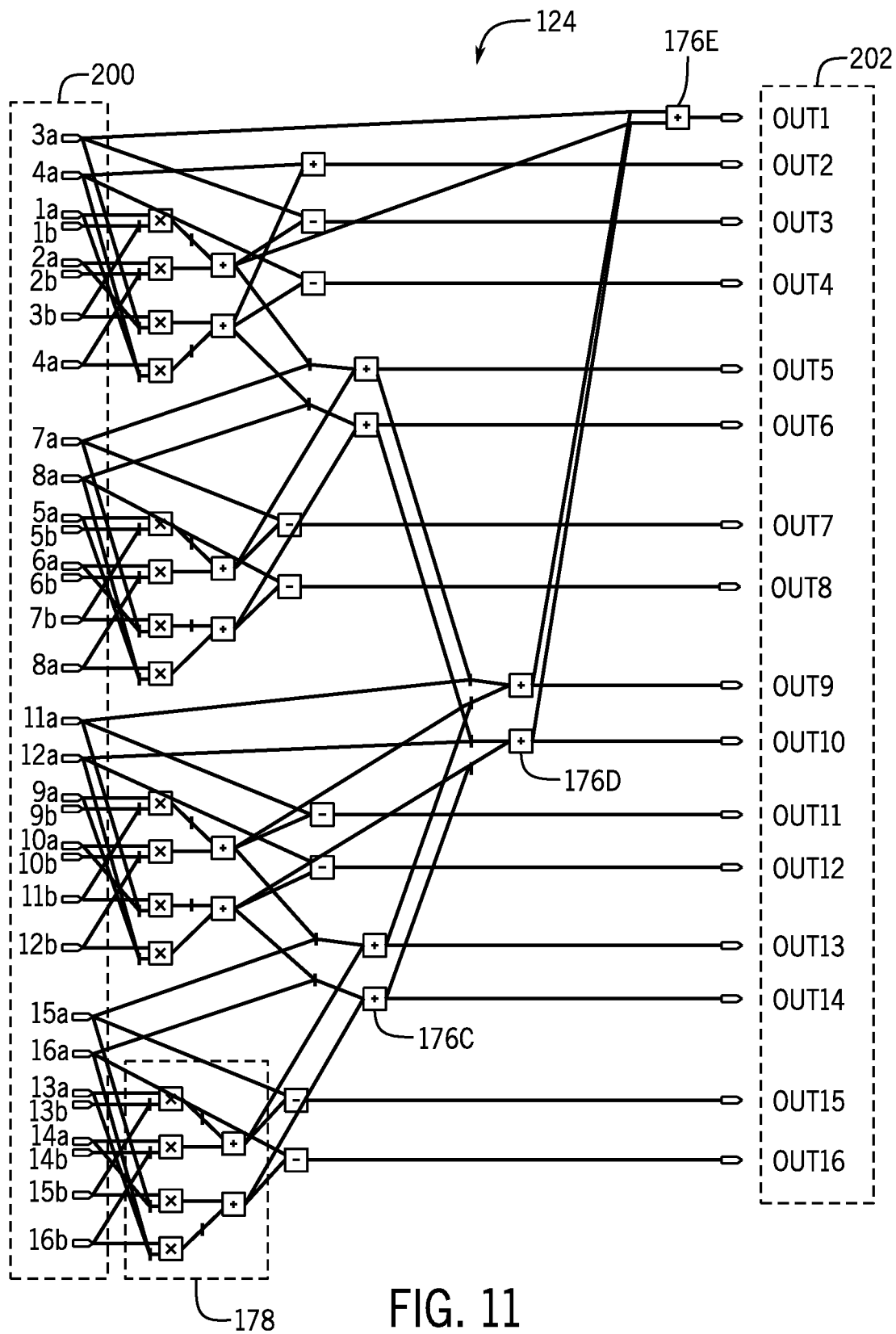
FIG. 11 is a block diagram of multiple accumulators of the example accumulator of FIG. 9 coupled together to form a portion of a compute network of the processing element of FIG. 6, in accordance with an embodiment.

For example, FIG. 11 is a block diagram of the complex multipliers 178 interconnected to form at least a portion of the compute network 124 of FIG. 6. The complex multipliers 178 may be further interconnected by additional adders 176, such as adder 176C, adder 176D, and adder 176E. Inputs 200 to the compute network 124 may change the operation performed by the compute network 124. The operation performed by the compute network 124 may permit processing of inputs 200 to generate outputs 202.

Figure 12:
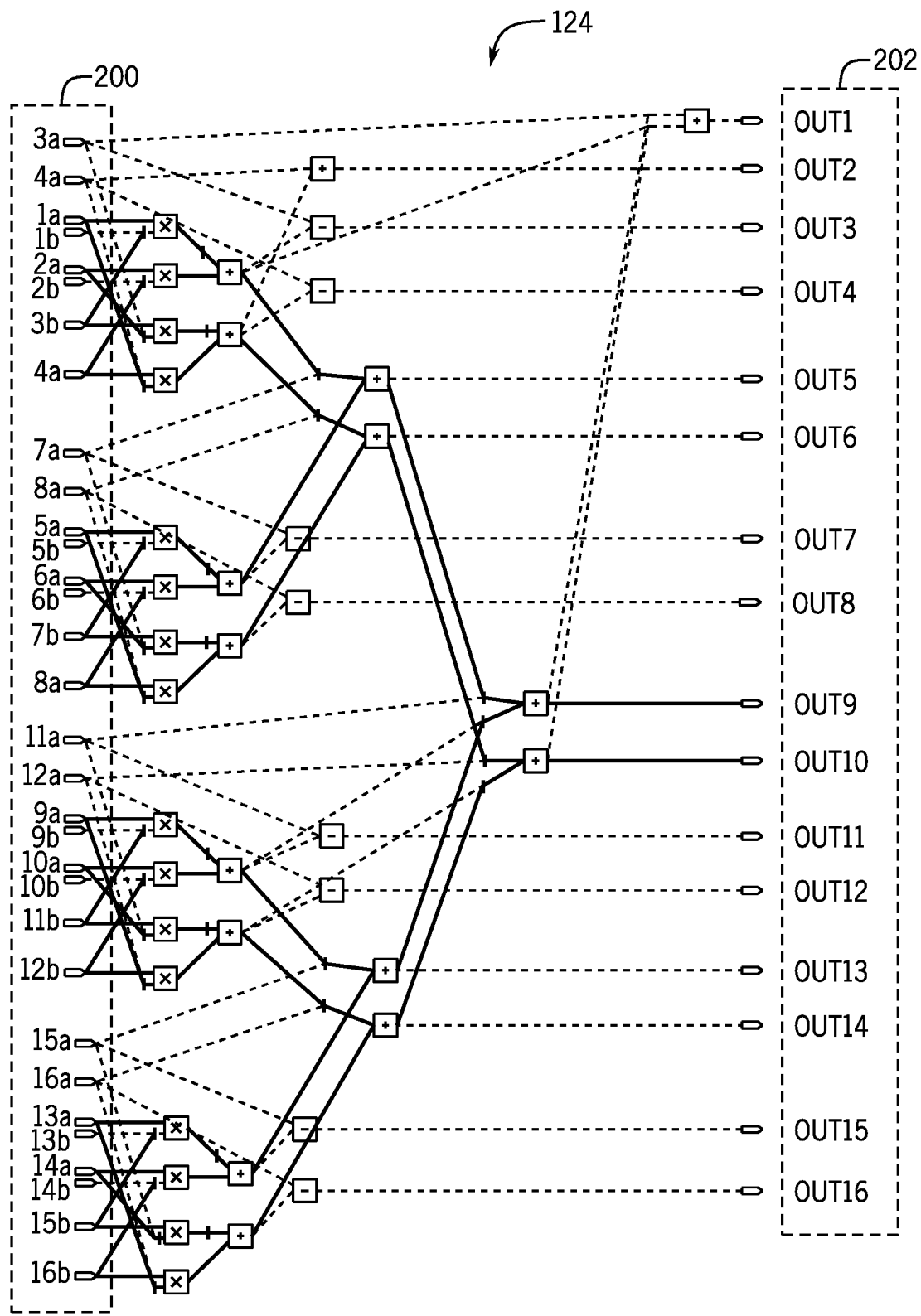
FIG. 12 is a block diagram of the portion of the compute network of the processing element of FIG. 6 configured to perform a complex number operation, in accordance with an embodiment.
Figure 13:
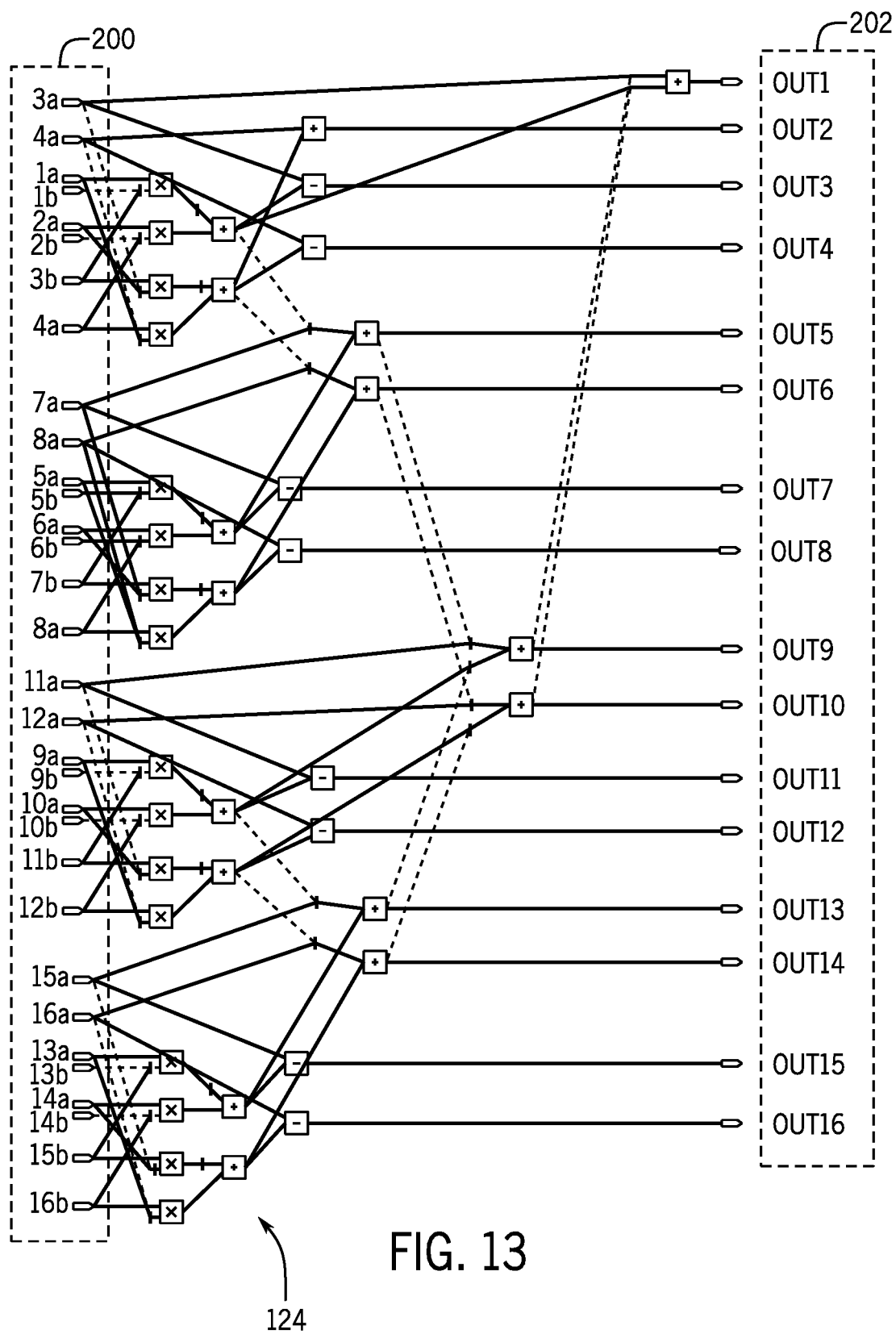
FIG. 13 is a block diagram of the portion of the compute network of the processing element of FIG. 6 configured to perform a Radix-2 operation, in accordance with an embodiment.
Figure 14:
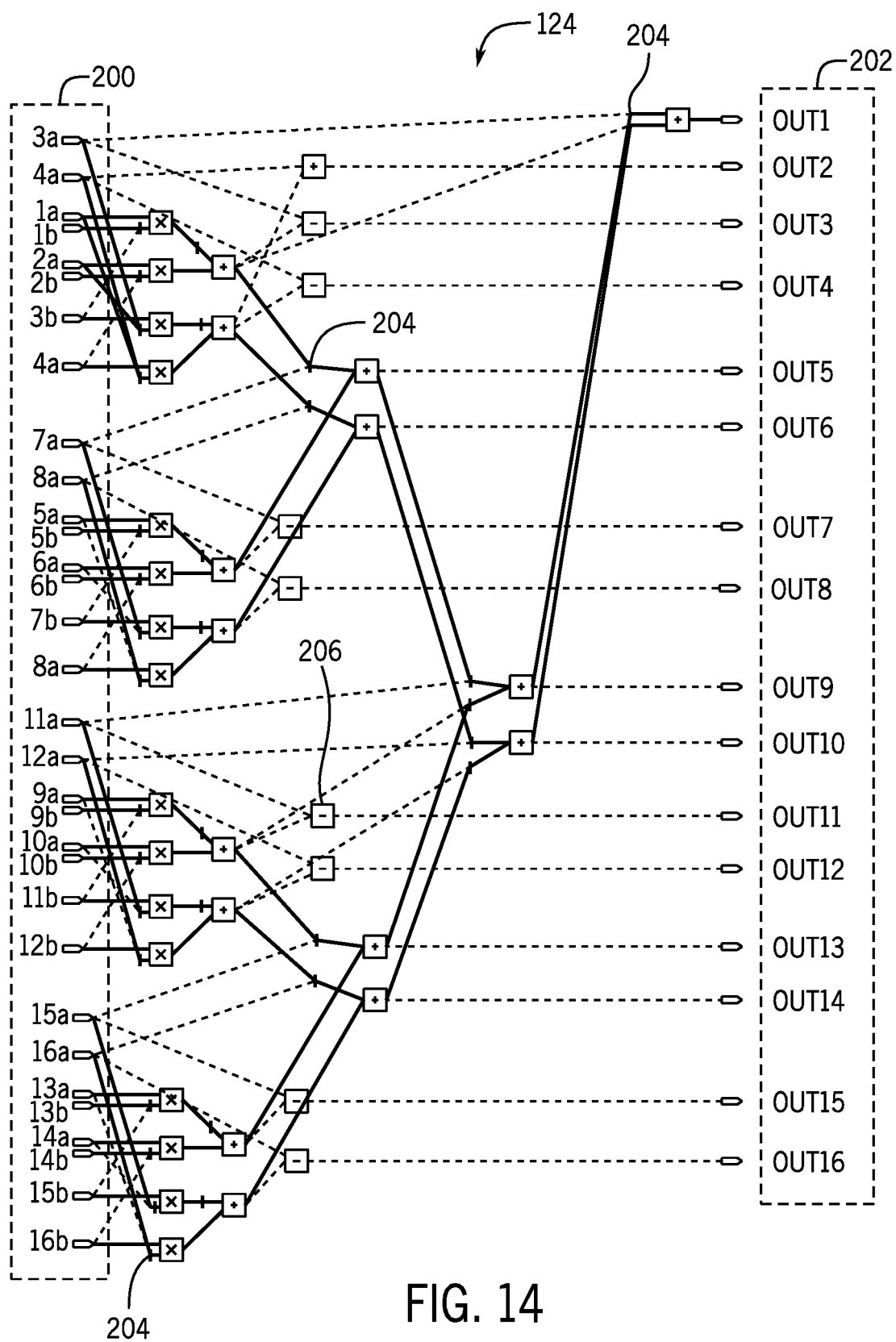
FIG. 14 is a block diagram of the portion of the compute network of the processing element of FIG. 6 configured to perform a real number operation, in accordance with an embodiment.

For example, when receiving a combination of real data type values and imaginary data type values as the inputs 200, the compute network 124 may perform a complex MAC operation. FIG. 12 is a block diagram of the compute network 124 operating to perform a complex MAC operation, where the outputs 202 resulting from the operations may include a combination of real data type values and complex data type values. Furthermore, FIG. 13 and FIG. 14 also show example operations able to be performed by the compute network 124 in response to the inputs 200. FIG. 13 is a block diagram of the compute network 124 performing a 4 parallel radix operation and FIG. 14 is a block diagram of the compute network 124 performing a real MAC operation. As may be apparent from FIGS. 11-14, a repeating structure may be leveraged to provide the compute network 124. Furthermore, multiplexers 204 may be coupled between the inputs 200 and a respective of multipliers 174 and/or between intermediate outputs from multipliers 174 and/or adders 176 and subsequent logic circuitry (e.g., adders 176, subtractors 206).

Figure 15:
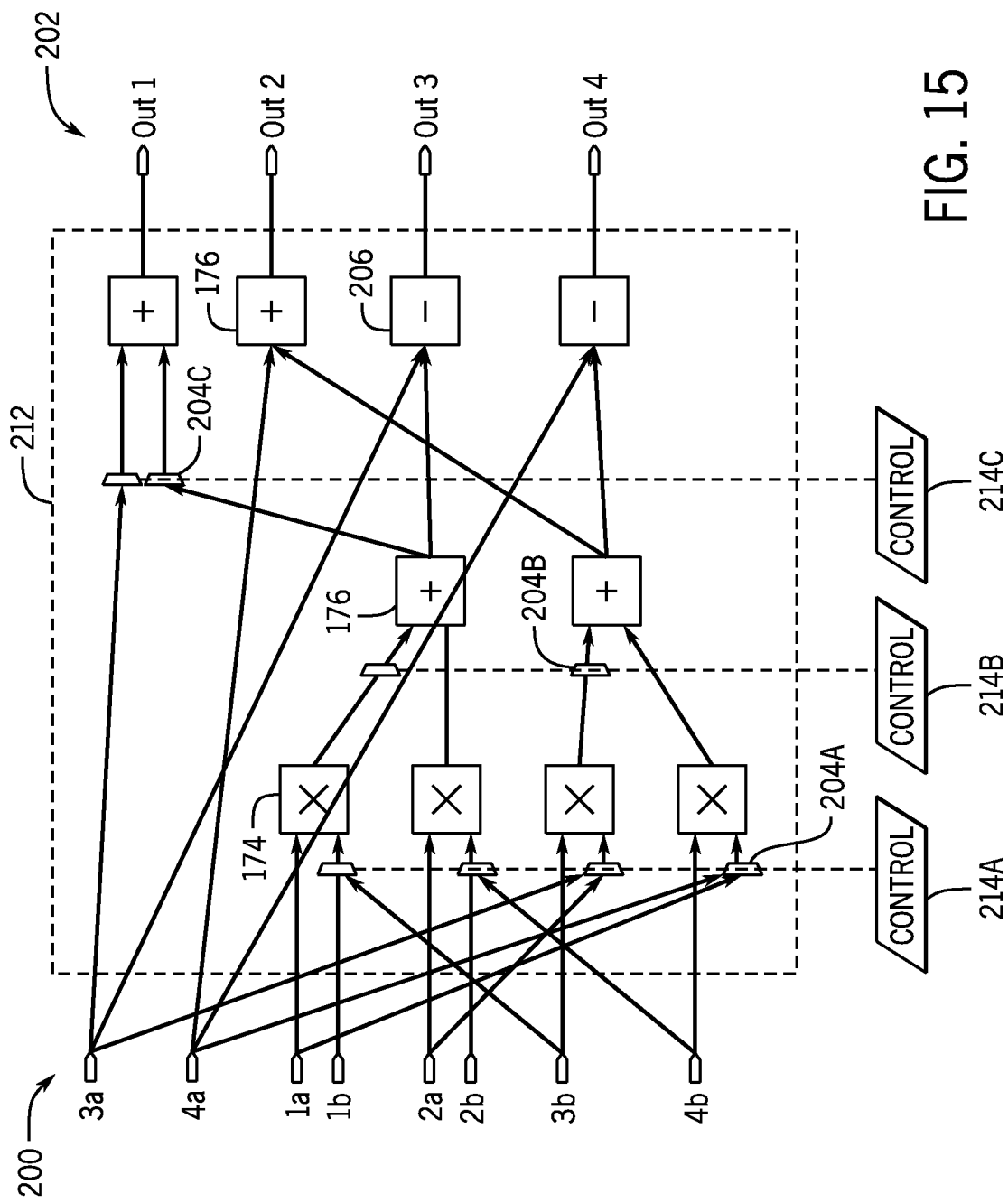
FIG. 15 is a block diagram of another portion of the compute network of the processing element of FIG. 6, in accordance with an embodiment.

FIG. 15 is a block diagram of the repeating structure (e.g., logic 212) shown implemented in the compute network 124. The logic 212 includes a subset of multipliers 174, adders 176, and subtractors 206. The multiplexers 204 may couple between outputs of logic and inputs of logic to help add delay into the computation and/or to route data (e.g., subsequent arithmetic results) between portions of the logic 212. Control signals 214 (e.g., control signal 214A, control signal 214B, control signal 214C) may be respectively transmitted by the switchbox interconnect 126 and/or from the instruction decoder 118 to prepare the logic 212 to perform the desired operation. For example, the control signals 214 may be transmitted as configuration bits from the instruction decoder 118, where each control signal 214A, control signal 214B, and control signal 214C corresponds to a bit of the configuration bits.

To better understand the logic 212, the inputs 200 are labeled. Some inputs 200 have a designation "a" and other inputs 200 have a designation "b." The multiplexers 204 in the respective data paths enable configuration of the logic 212 to perform operations instructed by the instruction decoder 118 without a reconfiguration of interconnections of the logic 212. For example, in a real MAC operation, the logic 212 may compute a dot product of vectors applied on the "a" subset of inputs 200 with the vector applied on the "b" subset of inputs 200. In a complex MAC operation, the logic 212 may perform (1a+i2a)*(3b+i4b), where the real result of the multiplication is output at "Out 3" of outputs 202 and where the complex result of the multiplication is output at "Out 4" of outputs 202. Furthermore, to perform the Radix 2 operation, the logic 212 may use complex inputs to generate complex outputs. In the logic 212, a first complex input may be applied at inputs 200 of "3a" for the real portion of the first complex input and at "4a" for the imaginary portion of the first complex input. A second complex input may be applied at "1a" for the real portion of the second complex input and at "2a" for the imaginary portion of the second complex input.

Figure 16:
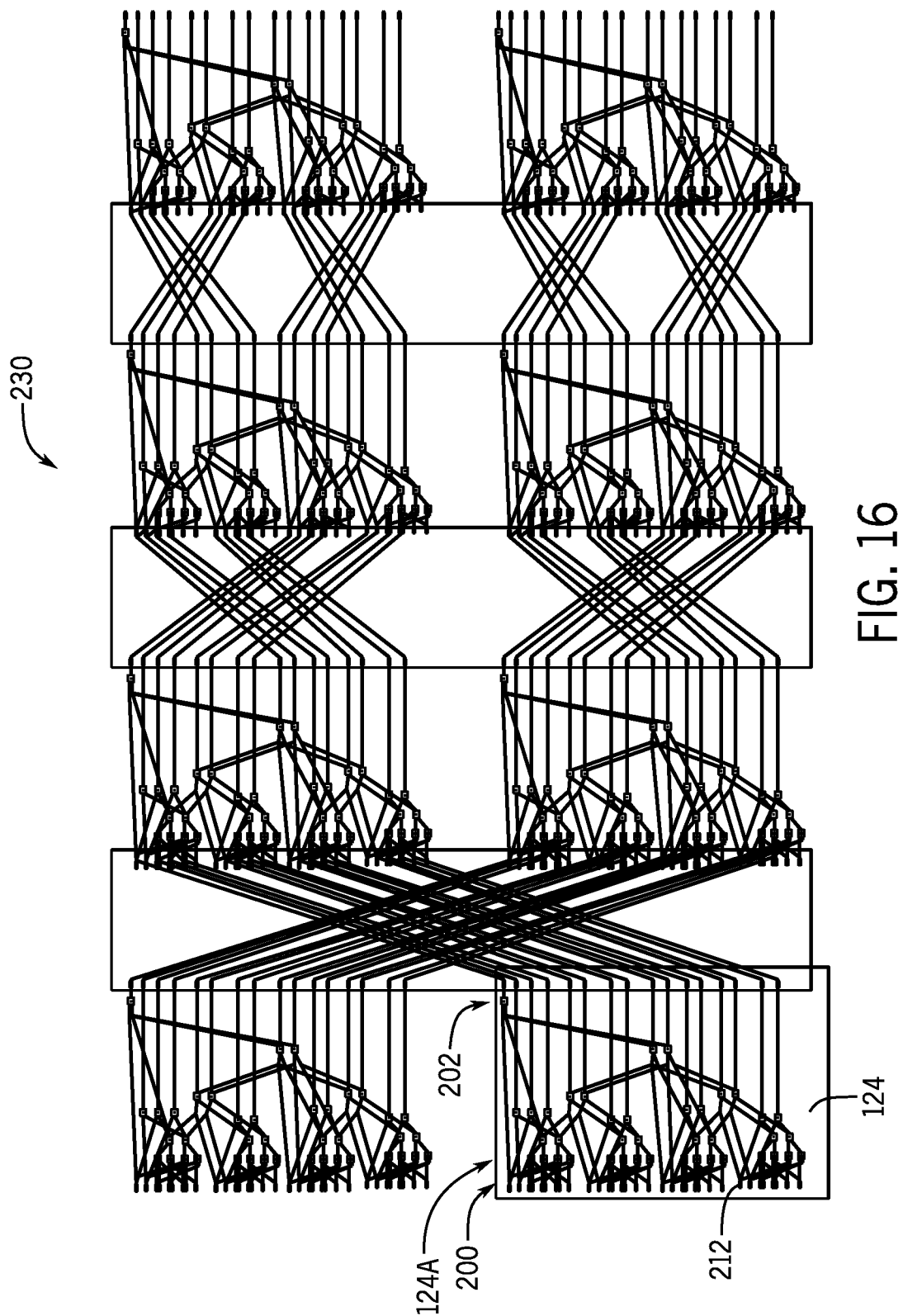
FIG. 16 is a block diagram of multiple processing elements of FIG. 6 coupled together in a scramble network, in accordance with an embodiment.

Some operations desired to be performed by the processing element 96 benefit from leveraging sequentially coupled processing elements 96, such as in a scramble network. FIG. 16 is a block diagram of a scramble network 230. The scramble network 230 may be designed to permit a relatively high-speed line rate FFT operation. One or more processing elements 96 may perform 4 radix-2 operations every clock cycle, and the output 202 from each may be sent to the scramble network 230 for input into a subsequent processing element 96. This transmission is represented by the interconnected repeated portions of logic 212, where respective compute networks 124 receive inputs 200 and output the resulting output 202 to a downstream compute network 124. It is noted that other circuitry of the processing element 96 is not depicted.

The scramble network 230 may exist along multiple hierarchies of the design. In this way, any size of FFT operation may be performed by the scramble network 230. For example, FFT operations may range in size from an 8-input FFT to 32-input FFT for one processing element 96 and/or spread across multiple processing elements 96 to accommodate up to 256-input FFT. It is noted that these ranges may change as additional processing elements 96 are included in the integrated accumulator 66. This particular example may be used to perform a 16-input FFT operation, identifiable since a respective compute network 124A receives 16 inputs as the inputs 200. It is noted that the overall latency of this configuration for a 16-input FFT operation may be approximately 200 ns (e.g., a value between 150 ns and 250 ns).

Figure 17:
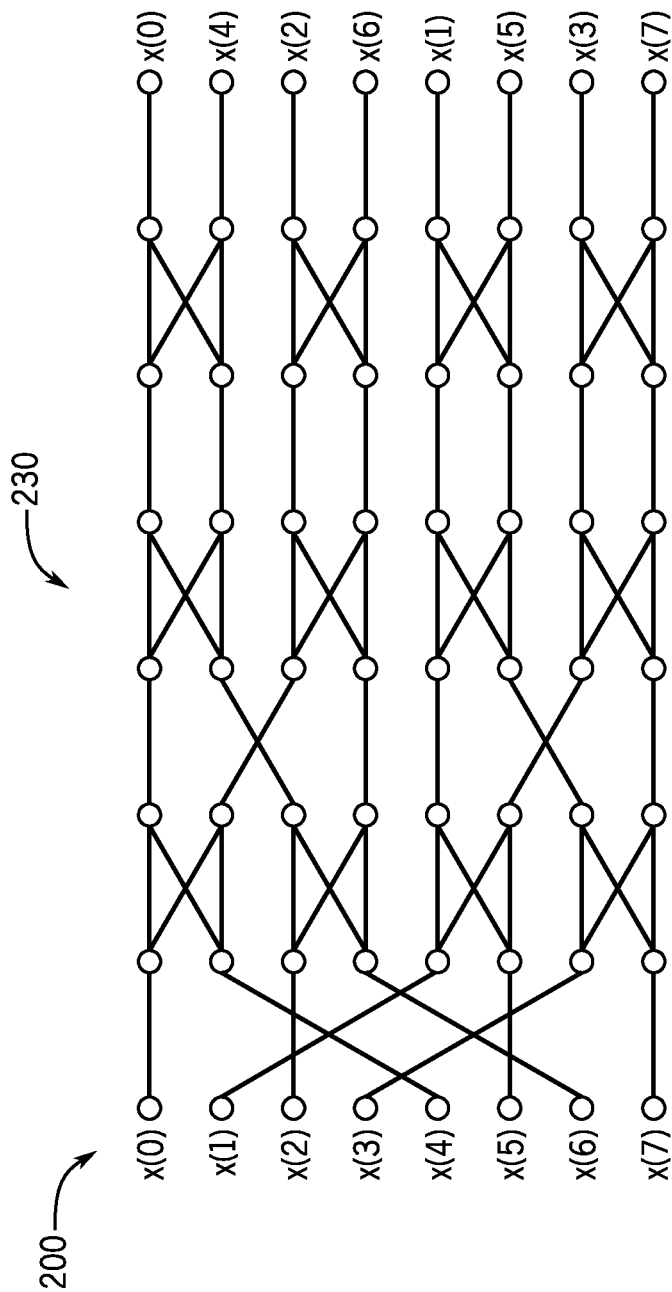
FIG. 17 is an illustration of a simplified representation of a portion of inputs and/or outputs of the multiple processing elements of FIG. 6 coupled together in the scramble network of FIG. 16, in accordance with an embodiment.

FIG. 17 is an illustration showing a simplified diagram of the scramble network 230. The scramble network 230 may operate to perform an 8-input FFT operation. To do so, a suitable number of processing elements 96 may be coupled together to perform the FFT operation. For an 8-input FFT operation, three stages of 4 Radix-2 elements are performed. This structure may resemble a Cooley Tukey 8-input FFT operation. An operation mask may be used to null a subset of the inputs 200 to reduce the total count of inputs from 16 inputs to 8 inputs (e.g., x(0) to x(7)). Furthermore, as will be appreciated, an operation mask may be used when performing certain types of processing operations using the processing element 96, such as convolution neural network (CNN) operations, convolutions, image processing operations, while operating on different sizes of matrices without desiring to reprogram the memory between matrices, processing different data access patterns (e.g., different data width being transmitted via integrated accumulator 66), or the like.

Figure 18:
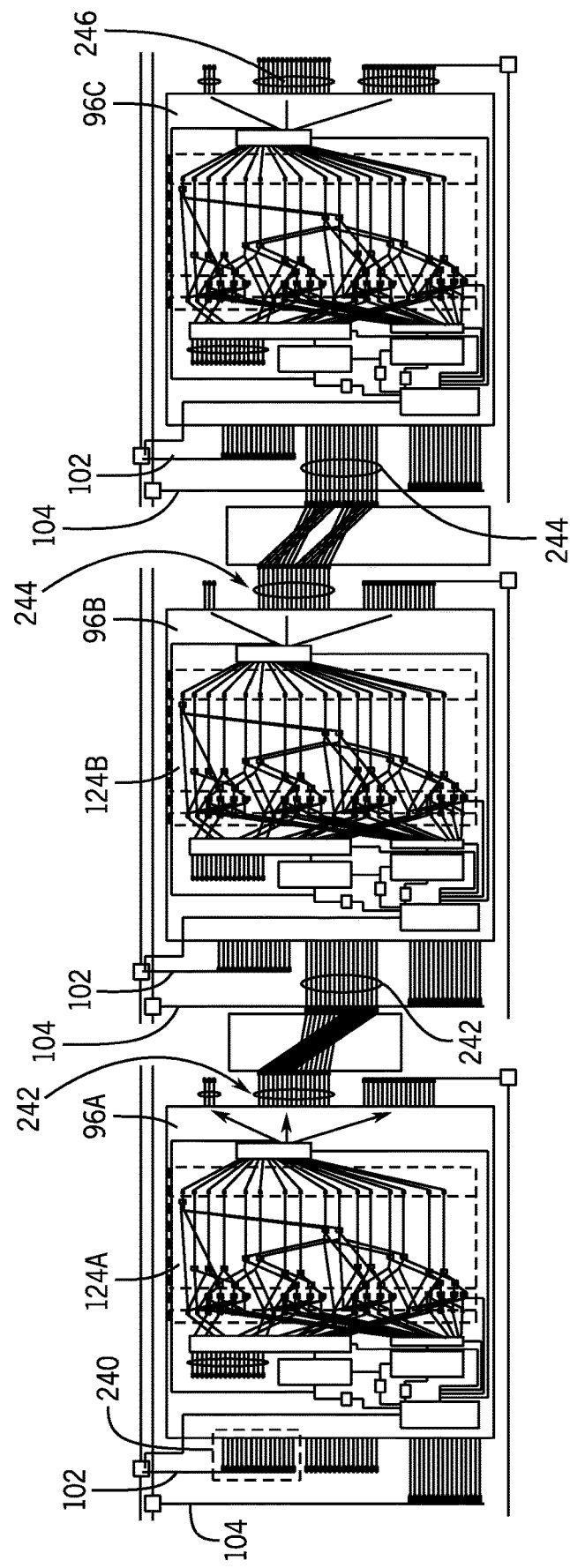
FIG. 18 is a block diagram of multiple processing elements of FIG. 6 coupled together in to provide hardware implementing the scramble network of FIG. 16, in accordance with an embodiment.

The connections shown in FIG. 16 and in FIG. 17 may be implemented via connect processing elements 96, as is shown in FIG. 18. FIG. 18 is a block diagram of the scramble network 230 as implemented across three processing elements 96 (e.g., processing element 96A, processing element 96B, processing element 96C). The processing element 96A receives data from bus 102. The processing element 96A may perform the first stage of the FFT on the inputs using the compute network 124A. The inputs may be fed through the compute network 124, and resulting outputs may be transmitted to the processing element 96B via bus 242. The processing element 96B may perform the second stage of FFT on the data received via the bus 242 using compute network 124B. Resulting outputs from the compute network 124 of the processing element 96B may be transmitted to the processing element 96C via bus 244. The processing element 96C may perform the third stage of FFT on the data received via the bus 244. Outputs from the processing element 96C may be transmitted out from the integrated accumulator 66 and/or from the processing element 96C as computation results of the 8-input FFT operation depicted in FIG. 16 and FIG. 17 via bus 246.

Since each processing element 96 may perform a 4-element complex vector MAC operation, a 16-element real vector MAC operation, and/or 4 Radix-2 complex butterfly operations, the various processing element 96 configurations may be combined to perform a multitude of operations. Outputs from each compute network 124 of each processing element 96 may be either outputted as is, stored in respective internal memories (e.g., memory 120, memory 122), combined using subsequent processing elements 96, or the like. For a streaming FFT operation, the output of any of the compute networks 124 may be scrambled and transmitted into neighboring processing elements 96 for multiple stages of the FFT operation.

Figure 19:
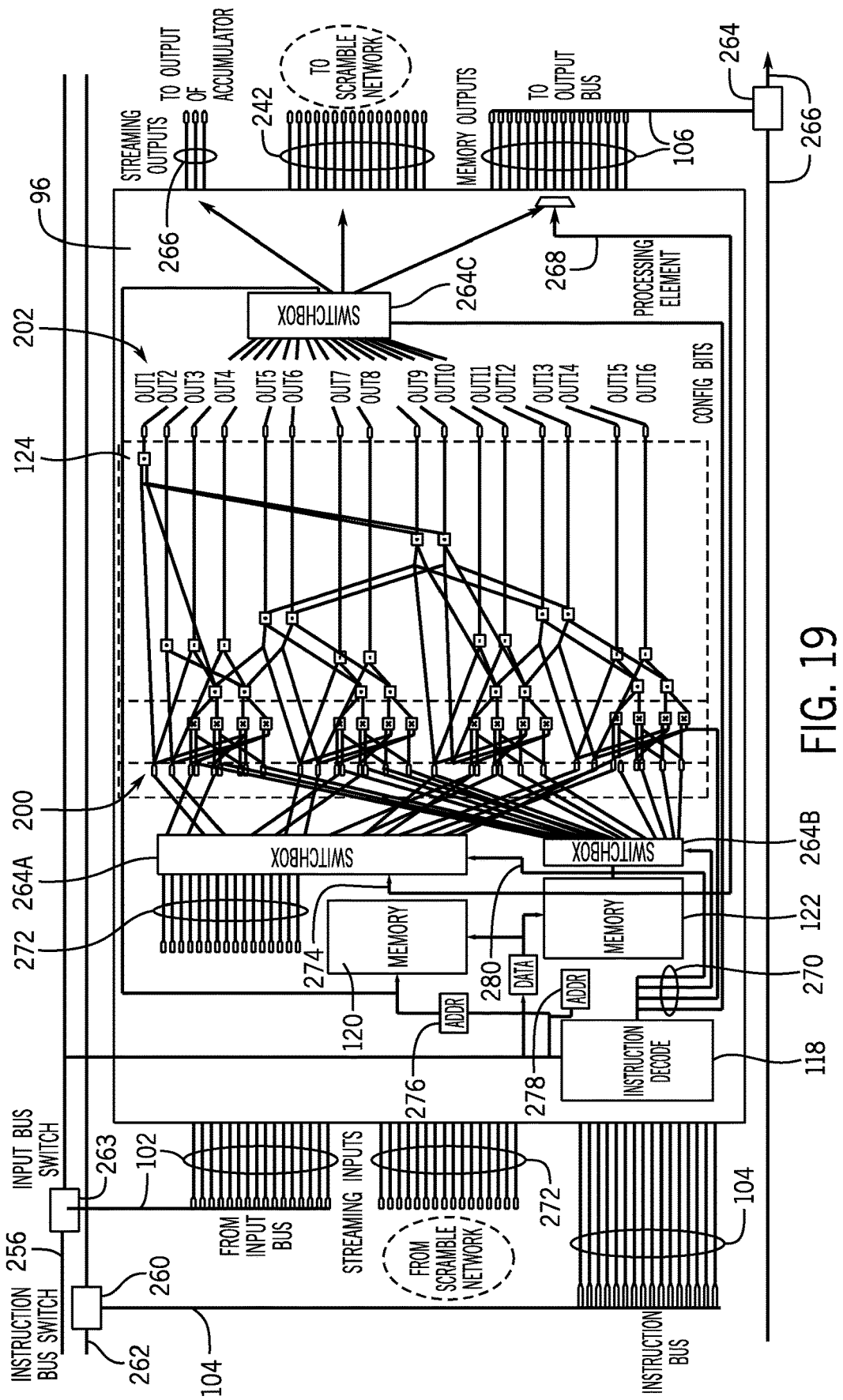
FIG. 19 is a block diagram of a detailed view of the processing element of FIG. 6, in accordance with an embodiment.

FIG. 19 is a block diagram of a detailed view of the processing element 96 shown in FIG. 18. The processing element 96A is shown as including each component described with FIG. 6 in addition to other circuitry. The processing element 96A may receive an instruction via the bus 104. An instruction bus switch 260 may receive each instruction transmitted via bus 262 and determine which of any instruction transmitted via bus 262 is to be transmitted to the processing element 96 and which are to be ignored.

The instruction bus switch 260 may help provide the multicast functionality of the integrated accumulator 66. Each processing element 96 and each PE group 98 may be assigned a unique number and/or a unique address. The instruction transmitted via the bus 262 may identify which processing element 96 and/or which PE group 98 the instruction is to be applied to using the unique number and/or unique address. Thus, the instruction bus switch 260 may compare its own number and/or identifier to the unique number, unique identifier, and/or the unique address of the instruction to determine whether the instruction applies to the processing element 96 and/or the PE group 98.

The instructions deemed to apply to the processing element 96 may be routed by the instruction bus switch 260 to transmit to the instruction decoder 118. The instruction decoder 118 may associate data received via bus 102 with the instruction. The instruction decoder 118 may determine configurations to apply to the processing element 96 to execute the instruction. The determined configurations may be applied using configuration bits and/or control signals generated by the instruction decoder 118. The compute network 124 may receive data from a first switchbox 264A and/or a second switchbox 264B based at least in part on the configuration bits. The first switchbox 264A, the second switchbox 264B, and the third switchbox 264C may be included in the switchbox interconnect 126. The switchbox interconnect 126 may control configuration of inputs to and outputs from the compute network 124.

The configuration bits may change which inputs 200 of the compute network 124A receive data and which do not. The configuration bits may also adjust how a third switchbox 264C transmits outputs 202 on the bus 106. For example, the configuration bits may change whether a portion of the outputs 202 transmit to an output of the integrated accumulator 66 (e.g., via bus 266), to a subsequent processing element 96 as part of a FFT operation and/or scramble network configuration similar to scramble network 23, to output bus via bus 106, or the like.

In some cases, the instruction received at the instruction decoder 118 may command for the compute network 124 to be bypassed. When this occurs, the configuration bits may configure the memory 120 to output directly to the bus 106 via bus 268.

Configurations generated by the instruction decoder 118 may be transmitted to the first switchbox 264A, the second switchbox 264B, the third switchbox 264C, the compute network 124 via bus 270. In response to applying the configurations, The first switchbox 264A may control data input corresponding to a first set of inputs received via the bus 104 (e.g., "a" set of inputs) and the second switchbox 264B may control data input corresponding to a second set of inputs received via the bus 104 (e.g., "b" set of inputs). The third switchbox 264C may control data output from the processing element 96 and/or from the compute network 124 in response to the applied configurations.

Moreover, the first switchbox 264A may apply data inputs for 128-bit and/or 256-bit elements, as defined by memory 120A, but control of the first switchbox 264A may be independent of control of the memory 120A. This segregated control may permit a larger set of configuration data to be transmitted. For example, the first switchbox 254A may select to apply data from memory 120 and/or memory 122 to inputs "a," thus permitting a larger variety of configurations supported (e.g., combinations of data sources that output to inputs "a" or a subset of the inputs to the compute network 124). The first switchbox 264A may additionally or alternatively cause 128-bit inputs and/or 256-bit inputs to transmit to the inputs "a." In some cases, it may be desired for the second switchbox 264B to couple to memory 122 without coupling to memory 120, such as if a streamlined configuration process is desired, such that the configuration of the second switchbox 264B may remain generally the same between processing operations.

An input to the first switchbox 264A may come from the bus 104, the scramble network 230 via bus 272, from the memory 120 via bus 274. An address 276 may define which data from the memory 120 is to be transmitted via the bus 274. It is noted that the bus 272 is split into two portions for ease of depiction in FIG. 19 and it should be understood that in an actual implementation these portions may be coupled together for transmission of data.

The second switchbox 264B operates similar to the first switchbox 264A. In this way, control of the second switchbox 264B is independent of control of the memory 122. Furthermore, the second switchbox 264B may receive data stored at address 278 and transmitted from the memory 122 via bus 280. The second switchbox 264B transmits this received data to the compute network 124 on the "b" subset of inputs 200. It is noted that in some cases, the first switchbox 264A may output to the "b" subset of inputs 200 while the second switchbox 264B may output to the "a" subset of inputs 200.

The third switchbox 264C may couple an output of the processing element 96 or an output from the memory 120A (e.g., the output transmitted via bus 268) to either the bus 106, a subsequent processing element 96 in the scramble network 230 (e.g., via the bus 242), or to an output of the integrated accumulator 66 (e.g., via the bus 266), or the like. Furthermore, in some cases, the output from the third switchbox 264C may be able to be stored in the memory 120. In this way, the third switchbox 264C may permit performance of memory-to-memory instruction operation. A memory-to-memory instruction operation may be any suitable arithmetic operation that uses the memory 120 and/or the memory 122 as data sources, where the result is written back into the memory 120 and/or the memory 122.

The memory 120 and the memory 122 may both store up to a 256-bit long word (e.g., 16 16-bit elements). The processing elements 96 may leverage both the memory 120 and the memory 122 to operate on matrix sizes larger than a bit width permitted by input buses (e.g., bus 102, bus 272) or output buses (e.g., bus 266, bus 242, bus 106). Furthermore, memory 122 may store weights and/or may output a same addressed memory location for one or more clock cycles. Outputting data from a same address (e.g., same memory location) over multiple clock cycles may be useful for line rate streaming operations and/or other operations, and thus may add to operational flexibility of the integrated accumulator 66. Data may be stored into the memory 120 and/or memory 122 as a 256-bit wide word, but depending on application and program, the upper 128-bits and/or lower 128-bits may be retrieved from the memory 120 and/or the memory 122 and may help conserve power consumed by the processing element 96.

The memory 120 may provide data to set of inputs 200 with suffix "a" and the memory 122 may provide data to set of inputs with suffix "b." This may be useful when, in a complex vector MAC operation, half of "a" inputs and half of "b" inputs are used. Disabling half of the memory (e.g., memory 120, memory 122) read outputs may also permit storing double the amount of data for those operations and save power by avoiding unnecessary or unused read operations. Saving power consumed by the processing element 96 may reduce an overall amount of power consumed by the processing element 96, thereby improving operation of the processing element 96 and/or of the integrated accumulator 66.

Data may be received into the processing element 96 via bus 102. Data is routed from bus 256 to bus 102 using the input bus switch 263. The input bus switch 263 may capture data sent on the bus 256 (e.g., input bus) for routing (e.g., transmission) on to the first switchbox 264A, the processing element 96, the instruction decoder 118, or the like. In some cases, the data sent via the bus 256 may include an identifier (e.g., number, address) that indicates to the input bus switch 263 that the data is to be routed to the processing element 96. The first switchbox 264A may determine whether or not to use data received via the bus 102, such as in response to a configuration applied to the first switchbox 264A by the instruction decoder 118.

An output bus switch 264 may output data generated and/or processed by the processing element 96 to a bus 266. The output bus switch 264 may include one or more logic gates, such as logical OR gates, to transfer data from inputs of the output bus switch 264 to outputs of the output bus switch 264. Bus management policies and scheduling may be programmed and communicated to the processing element 96 via instructions transmitted via the bus 104. In some cases, the bus management policies and scheduling may be programmed as such to permit relatively high throughput of inputs to outputs with little to no delay between cycles of processing performed by the processing element 96 (e.g., an amount of time from the end of processing a first data set to beginning to process a second data set).

Figure 20:
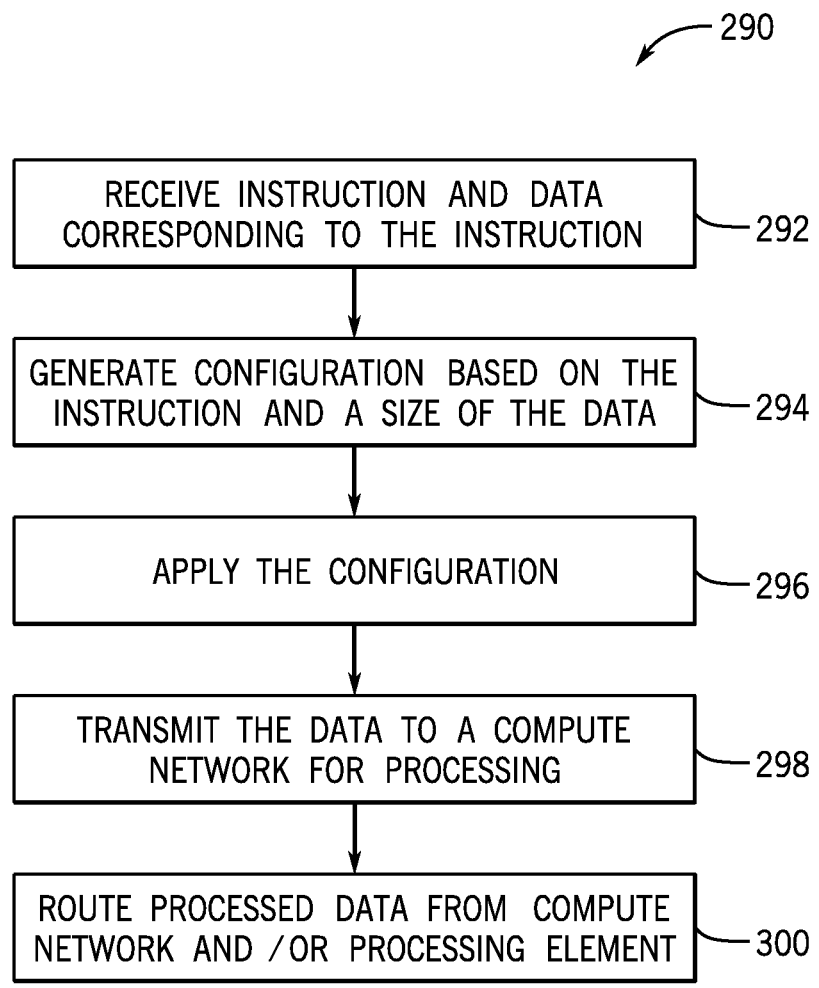
FIG. 20 is a flowchart of a process for operating the processing element of FIG. 19, in accordance with an embodiment.

To help explain operation of the processing element 96, FIG. 20 is a flowchart of a process 290 for operating the processing element 96 to process data received via the bus 102. The process 290 is described as performed by the processing element 96, though it should be understood that various operations of the process 290 may be performed by components of the processing element 96 and/or by processing circuitry external to the processing element 96, in some cases. Furthermore, although described in a particular order below, it should be understood that any suitable order of operations may be used to perform the process 290.

At block 292, the processing element 96 may receive an instruction via the bus 104 and data via the bus 102. The instruction bus switch 260 may determine that a particular instruction transmitted via the bus 262 applies to the processing element 96, and may route the particular instruction from the bus 262 to the bus 104 for use by the processing element 96. The input bus switch 263 may determine that a particular data or data set transmitted via the bus 256 applies to the processing element 96, and may route the particular data or data set from the bus 256 to the bus 102 for use by the processing element 96. In both cases, the input bus switch 263 and/or the instruction bus switch 260 may determine applicable messages (e.g., instruction, data, data set) based at least in part on identifiers transmitted with the messages, such as names or addresses that indicate to which processing element 96 the instruction or data set or data is to be transmitted.

At block 294, the processing element 96 may generate a configuration based on the instruction received via the bus 104 and/or a size of the data received via the bus 102. In this way, the configuration may program the processing element 96 to prepare to process the data received via the bus 102 according to the instruction received via the bus 104.

At block 296, the processing element 96 may apply the generated configuration to components of the processing element 96. The configuration may be applied before the processing element 96 begins adjusting an output based on the data and/or begins processing the received data. In some cases, the configuration is applied to the processing element 96 by generating configuration bits to be used to program the components. The configuration applied may change relative weightings between respective multipliers 174, adders 176, subtractors 206, or the like. Changing the relative weightings of these components may change by how much an output from the component is adjusted (e.g., increased, decreased) relative to the input into the component. Direct control signals may be generated to change configurations of the components. The configuration may be transmitted via the bus 270. Configurations may be applied to the first switchbox 264A, the second switchbox 264B, the third switchbox 264C, output circuitry of the processing element 96, or the like. The configurations, once applied, may change how the received data is transmitted for processing through the processing element 96. For example, the configurations may define to where outputs are transmitted from the processing element 96 and/or a number of inputs into the compute network 124 that are to be masked, such as may occur when a data set has a data size that is less than a maximum size capable of being processed by the processing element 96.

At block 298, the processing element 96 may transmit the data to the compute network 124 for processing. The data is processed based at least in part on the configuration applied at block 296 and/or based at least in part on which inputs are used to route the data through the compute network 124.

At block 300, the processing element 96 may transmit the data after being processed from the processing element 96. For example, the processed data may be output from the third switchbox 264C via the bus 266, the bus 242, and/or the bus 106. In some cases, the output may be routed back to the memory 120 and/or the memory 122 for use in a future operation of the processing element 96.

Figure 21:
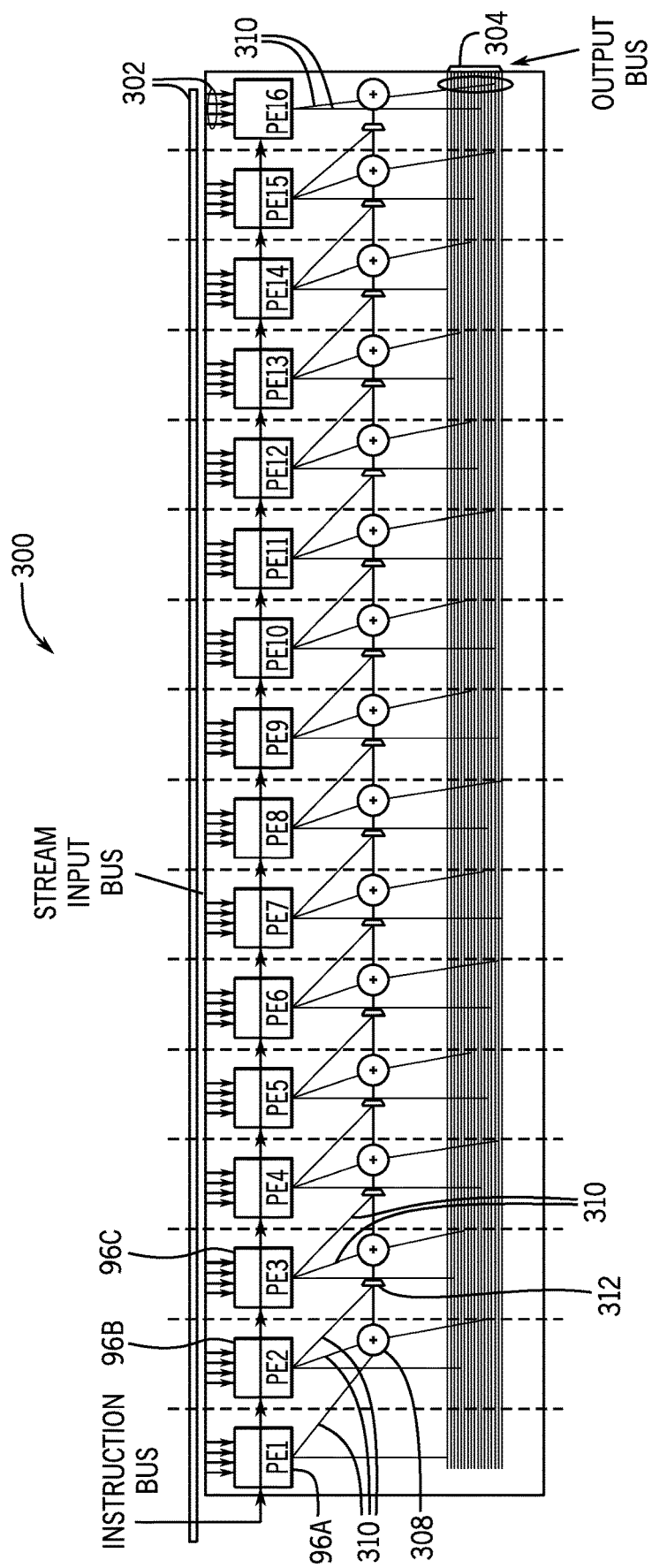
FIG. 21 is a block diagram of interconnections between adjacent processing elements when multiple processing elements of the processing element of FIG. 19 are interconnected, in accordance with an embodiment.

FIG. 21 is a block diagram of interconnections between adjacent processing elements 96 shown as part of a PE group level view. 16 processing elements 96 are shown as interconnected using a stream input bus 302, an output bus 304, and an instruction bus 306. The stream input bus 302 may include any number of data transmission lanes, for example 4 lanes. The stream input bus 302 may be a bus used for supplying stream inputs to the various processing elements 96, such as for streaming digital signal processing operations. The instruction bus 306 may be the same bus as bus 262 and/or may be a dedicated bus coupling between the processing elements 96. The instruction bus 306 may be used for a self-controlled multicast operation of processing instructions.

The output bus 304 may include any number of data transmission lanes, for example 31 lanes. The output bus 304 may collect processing data output from one or more of the processing elements 96. In this way, the output bus 304 may be multiplexed among the various results that the processing elements 96 each generated. The output bus 304 may be associated with adders 308. Each adder 308 output, and any bypassing of the adder 308, may be controlled by the neighboring processing element 96 configuration. The configuration may be applied via bus 310 and generated via instruction decoder 118. Once applied, the configuration may change a state of multiplexer 312 and/or deactivate or activate the adder 308. For example, while performing a line rate [1×64]×[64×1] complex MAC operation, each adder 308 may be activated. Each processing element 96 may perform a [1×4]×[4×1] complex vector MAC operation and the adders 308 may add partial sums from each processing element 96 and couple the sum of the partial sums to the output bus 304.

A variety of operations may be performed using this combination of structures. For example, based on the adder 308 activation operations and/or bypass operations, each group of 16 processing elements 96 may be used to perform operations of [1×64]*[64×1] complex vector MAC, or 2 [1×32]*[32×1] complex vector MAC operations, or 4 [1×16]*[16×1] complex vector MAC operations, or 2 [1×16]*[16×1] and 1 [1×32]*[32×1] complex vector MAC operations, up to 16 [1×4]*[4×1] complex vector MAC operations, or the like.

Figure 22:
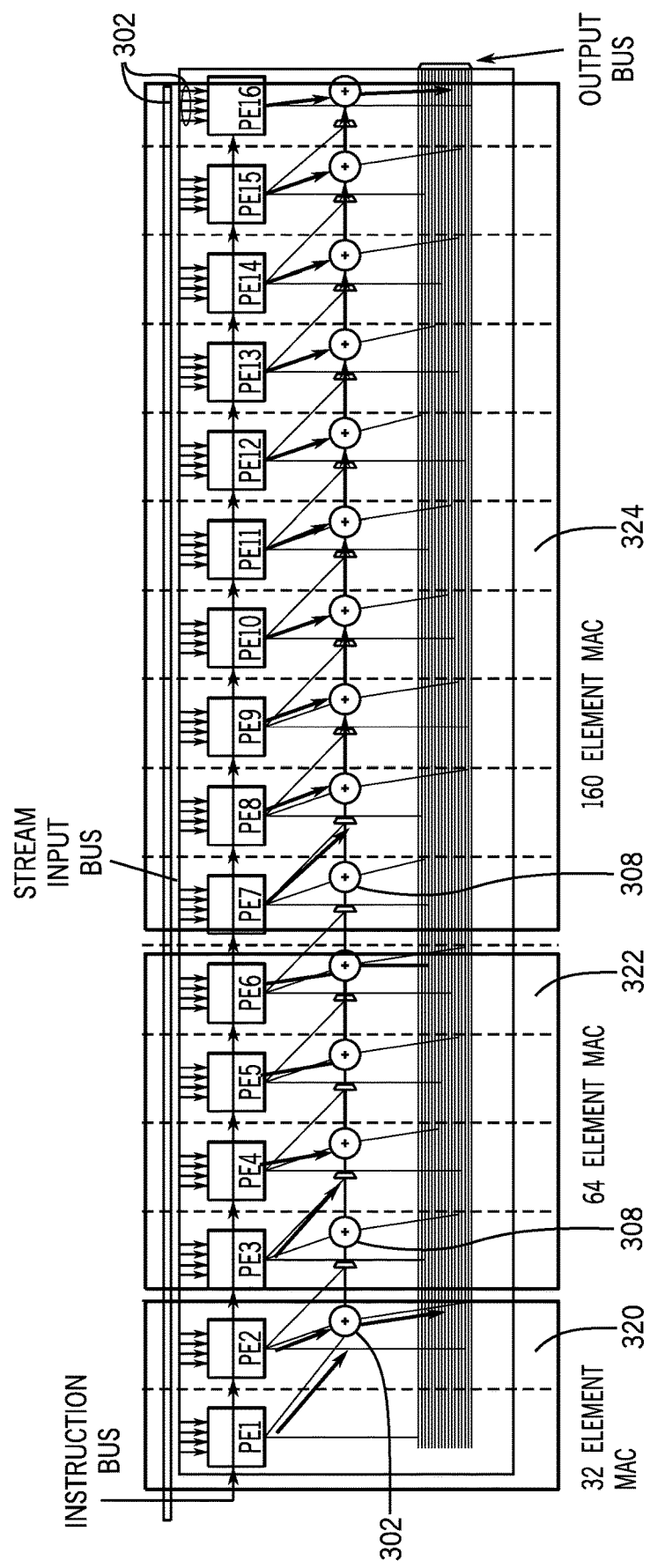
FIG. 22 is a block diagram of an example grouping of the adjacent processing elements of FIG. 21, in accordance with an embodiment.

FIG. 22 is a block diagram of an example grouping of the processing elements 96 of FIG. 21 to perform simultaneous processing operations. For example, the processing elements 96 are shown in three groups (e.g., PE group 320, PE group 322, PE group 324). The PE group 320 may perform a 32-element real MAC operation. The PE group 322 may perform a 64-element real MAC operation. The PE group 324 may perform 160-element real MAC operation. Furthermore, each of the PE group 320, the PE group 322, and the PE group 324 may perform at least some of their respective operations substantially simultaneous to each other. It is noted that while the processing elements 96 are operated in a streaming mode, each of the depicted operations performed by the PE group 320, the PE group 322, and the PE group 324 may complete within approximately 20 ns (e.g., between 15 ns and 25 ns) and a new input may be applied every clock cycle, enabling high throughput and low latency for this architecture.

In both FIG. 21 and FIG. 22, the depicted group of processing elements 96 (e.g., 16 processing elements 96 coupled such that stream input bus 302 is shared and output bus 304 is shared) may operate as a systolic wave, where the buses (e.g., stream input bus 302, output bus 304, instruction bus 306) are pipelined. Since the buses transmit data in a same direction (e.g., direction of data carry), such a pipeline configuration may hide or negate a systolic wave nature of the group of processing elements 96. Systolic wave architectures may be prone to relatively high amounts of latency (e.g., calculation latencies, processing latencies), and the latencies may be higher when performing sequential addition operations. However, if addition circuitry is coupled in a pipeline, such as in FIG. 21 and FIG. 22 (e.g., a configuration that causes data computation results to transmit in a same direction on input and/or output buses), overall latencies may reduce. For example, overall latencies of the addition circuitry in the pipeline may reduce from a latency of 32 cycles (or more) to a fixed 16-cycle latency. In this way, as the first processing element 96 outputs its resulting data for accumulation, the first processing element 96 begins processing another set of inputs while its previous output is accumulated with an output from the second processing element 96 (e.g., processing element 96 coupled downstream from the first processing element 96), and so forth, thereby hiding at least some latency associated with some accumulation operations.

To a user and/or component coupled to the integrated accumulator 66, accessing any processing element 96 to get a data output may involve a clock cycle delay (e.g., 16 clock cycle delay) equal or substantially similar to that associated with systolic wave operation. However, by implementing the systolic wave architecture in this way depicted in FIG. 21 and/or FIG. 22, register delay timing may be reduced by a factor (e.g., a factor of two) and power may be conserved and/or a footprint reduced that may have been used otherwise to provide pipeline registers. Also, as described, at least some linear latency of adders 308 within the systolic wave may be hidden and/or reduced to a negligible amount. In this way, no latency may be added to processing for implementing the linear adder tree (e.g., the process of adders 308 outputting for subsequent addition and/or accumulation operations) which provides an added flexibility to accommodate larger matrix sizes.

Figure 23:
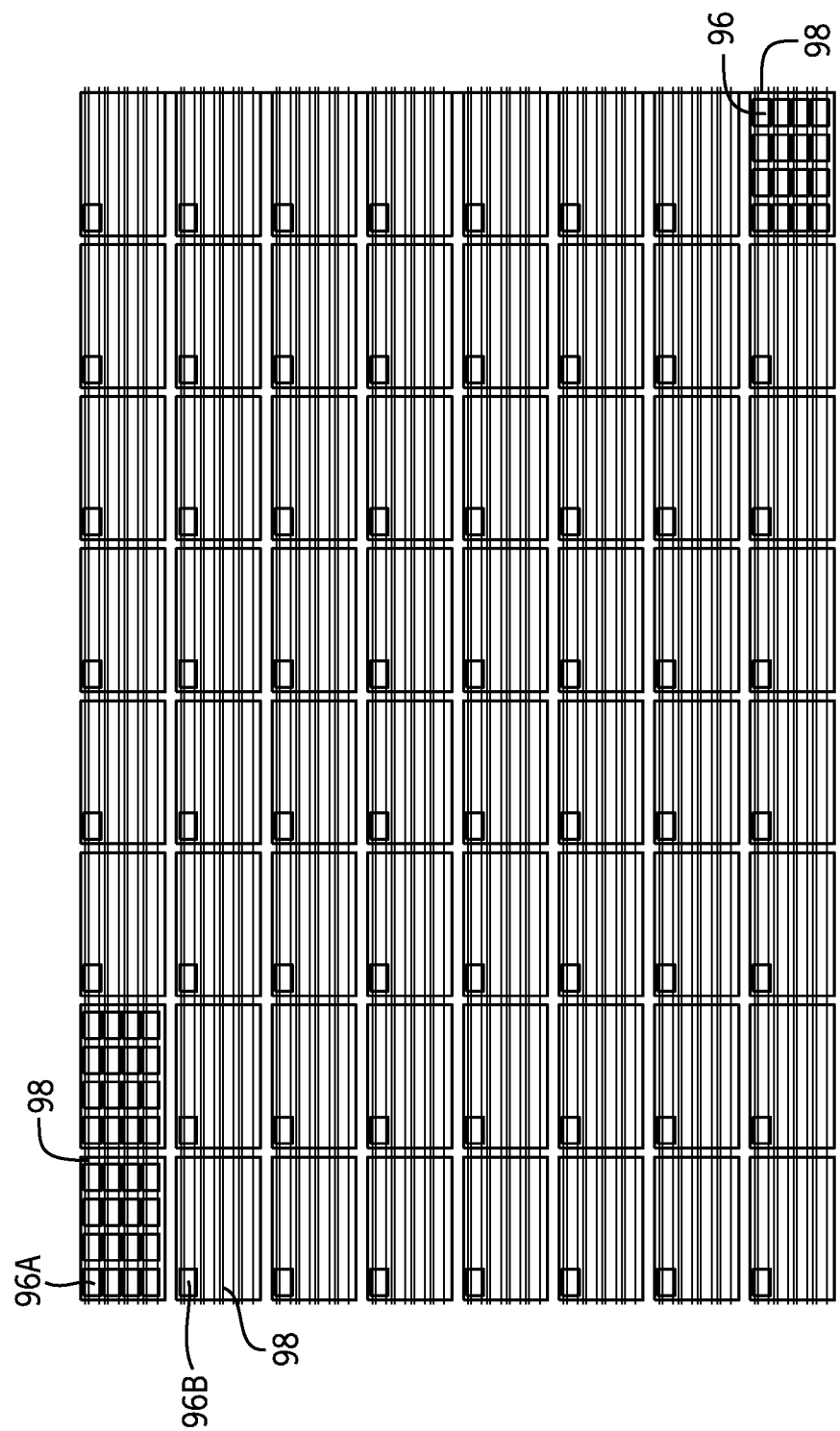
FIG. 23 is a block diagram a first example addressing operation of an arrangement of multiple processing elements of the processing element of FIG. 19, in accordance with an embodiment.

The systolic wave and/or grouping flexibility of the processing element 96 structure may be also applied to instruction deployed. For example, FIG. 23 is a block diagram of multiple processing elements 96 to provide a network of processing circuitry for the integrated accumulator 66. Any number of processing elements 96 may be grouped together to form the PE groups 98. In this example, 16 processing elements 96 for a PE group 98.

As described above, the processing elements 96 may be individually addressed for deployment of instructions and/or data to the processing element 96. Thus, an address used for the processing element 96A may be different from the address used for the processing element 96B.

In some cases, an instruction broadcast mode may be used. In the instruction broadcast mode, an address used for an instruction and/or data (or data set) may indicate that it is to be delivered to each processing element 96 associated with a corresponding address within each PE group 98. In this way, when in the broadcast mode, an address used to broadcast an instruction to both the processing element 96A may partially match an address used for the processing element 96B.

Each processing element 96 and each PE group 98 may be assigned a unique number or address. The processing element 96 that the instruction is targeted for is specified in the instruction as a part of a message or packet transmitted the instruction. The instruction bus switch 262 of the PE group 98 and/or the instruction bus switch 262 for processing element 96 may compare its own number and/or identifier with the number and/or identifier included in the instruction and then decides whether that instruction is applicable to itself, and if yes, forwards the instruction to the respective instruction decoder 118. As a part of multicast, there is a broadcast code included in the instruction set. For example, when an instruction includes the broadcast address for a PE group 98 and a specific address for a processing element 96, each of the PE groups 98 may permit the instruction to propagate through the instruction bus switches 262 for each processing element 96, permitting each processing element 96 to eventually receive the instruction when its determined that the instruction corresponds to that processing element 96. (e.g., when the identifier of the processing element 96 matches a portion of the identifier of the instruction corresponding to the processing element 96 relative location within a generic PE group).

Figure 24:
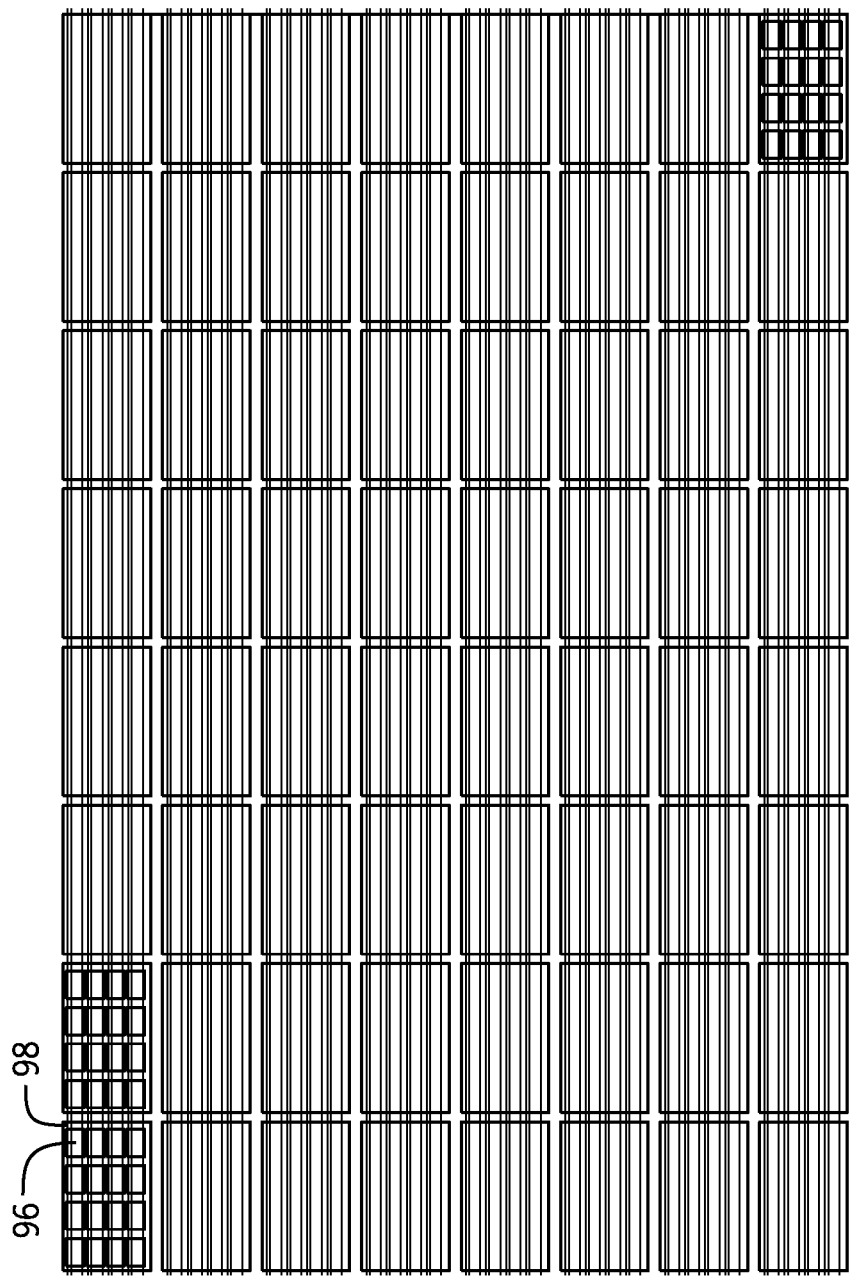
FIG. 24 is a block diagram a second example addressing operation of the arrangement of multiple processing elements of FIG. 23, in accordance with an embodiment.

As another example of this, FIG. 24 is a block diagram of multiple processing elements 96 to provide another network of processing circuitry for the integrated accumulator 66. In this case, certain processing elements 96 are emphasized to show that groups of processing elements 96 may be addressed to receive an instruction as opposed to respective processing elements 96. One instruction may be broadcast to each of the PE group 98 when indicated to do so in the instruction, such as in an identifier of the instruction.

Figure 25:
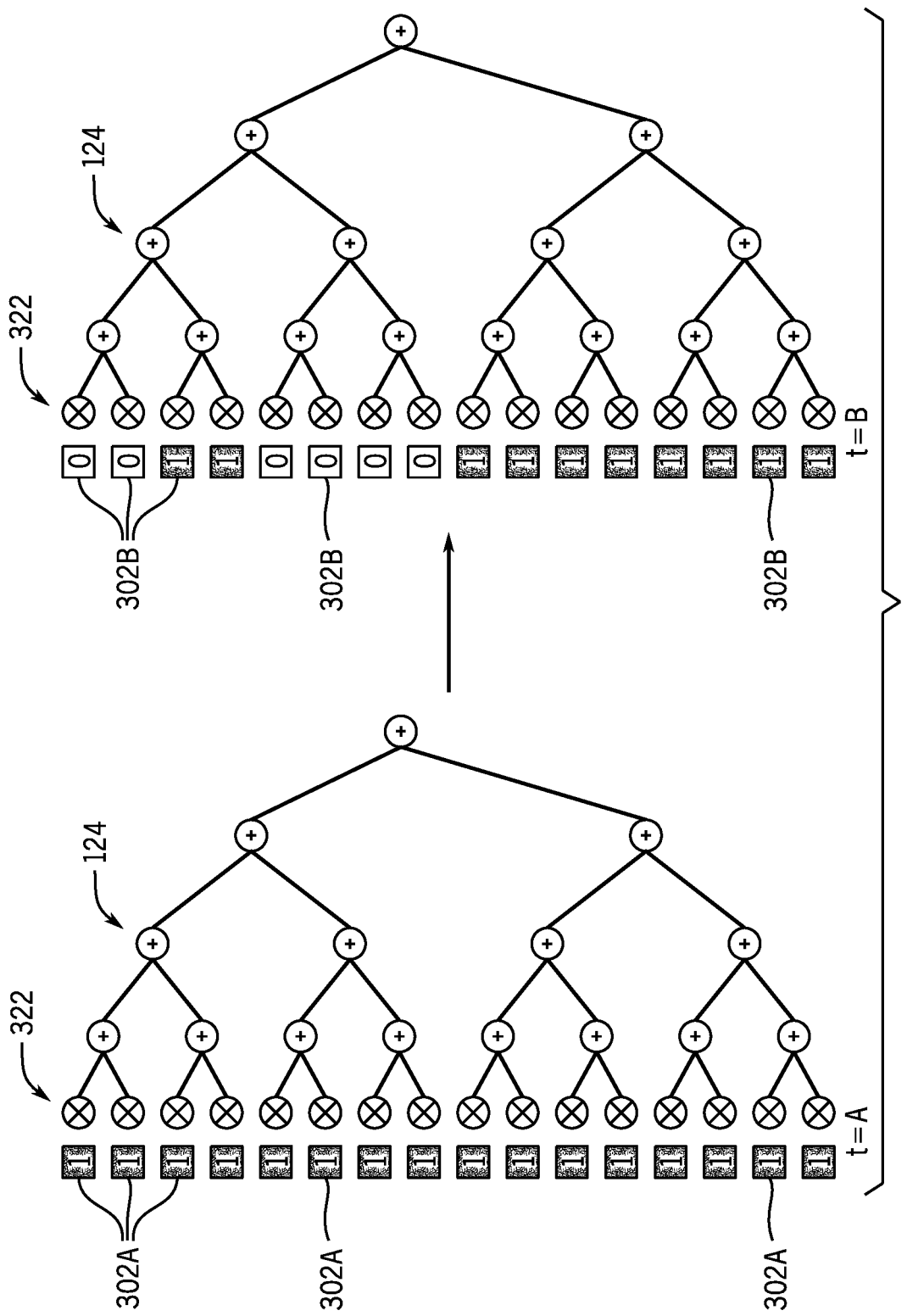
FIG. 25 is an illustration of an effect of applying an operational mask to inputs of the compute network of the processing element of FIG. 19, in accordance with an embodiment.

As described above, some operations performed by PE groups 98 and/or processing elements 96 may benefit from applying an operational mask to inputs to respective of the compute networks 124. FIG. 25 is an illustration showing an effect of applying an operational mask (e.g., represented by symbols 302A and symbols 302B) to inputs 320 of the compute network 124. When it is desired to have each of the inputs 320 transmitted data into the compute network 124, the mask may include a number of logical high values (e.g., "1") for each input that is to be active. In this case, a mask including values of "1111 1111 1111 1111" may permit each of the inputs 320 to transmit data into the compute network 124, such as the mask applied at a first time (e.g., t=A).

However, when it is desired for a subset of the inputs 320 to transmit data into the compute network 124, a mask may be used to accomplish this. For example, a mask of "0011 0000 1111 1111" may operate to deactivate inputs into the compute network 124 where the value of the mask is a logical low value (e.g., "0") and may operate to activate or permits inputs into the compute network 124 where the value of the mask is a logical high value (e.g., "1"). In this second example, such as at time equals B (e.g., t=B, a second time different than the first time, A or t=A), the number of inputs transmitting data into the compute network 124 reduces from 16 inputs 320 to 10 inputs 320. Use of the operational mask may permit certain operations to be performed by one or more processing elements 96. For example, operations associated with convolution neural networks (CNN), convolutions, operations that use different sizes of matrices without reprogramming between use of the different sizes of matrices, or the like may each benefit or generally use an operational mask to perform the determinations. Furthermore, the operational mask may also permit accommodation of different data access patterns by masking inputs to the compute network 124 and/or to the processing element 96, such as transmitting from the integrated accumulator 66 at a different data width than a data retrieved from a memory and/or received at an input of the integrated accumulator 66.

Figure 26:
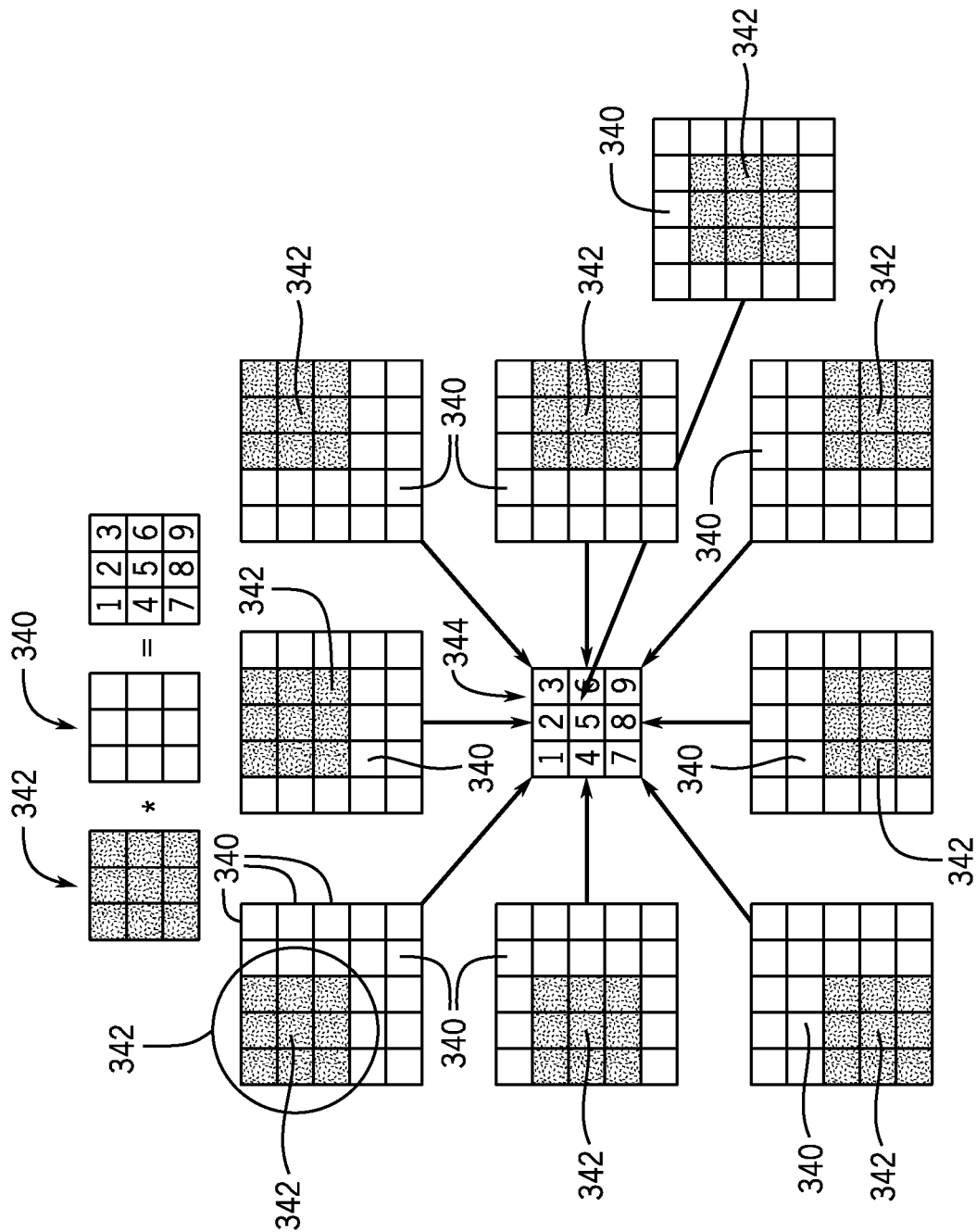
FIG. 26 is an illustration of a convolution of size 3×3 performed to a 5×5 matrix, in accordance with an embodiment.

To elaborate, FIG. 26 is an illustration of an example 3×3 convolution operation. In this operation, a base image 340 may be processed based on a convolution kernel 342 that is moved around the base image 340 to generate a result associated with a convolution of the data within that portion of the base image 340 corresponding to a location of the convolution kernel 342. The convolution kernel 342 may move around the base image 340 nine times, as represented by image 344.

Convolutions and/or convolution neural networks may use a relatively complicated form of processing since it uses relatively high movement around a dataset. However, applying operational masks may enable convolutions and/or convolution neural networks to be performed by processing elements 96.

Figure 27:
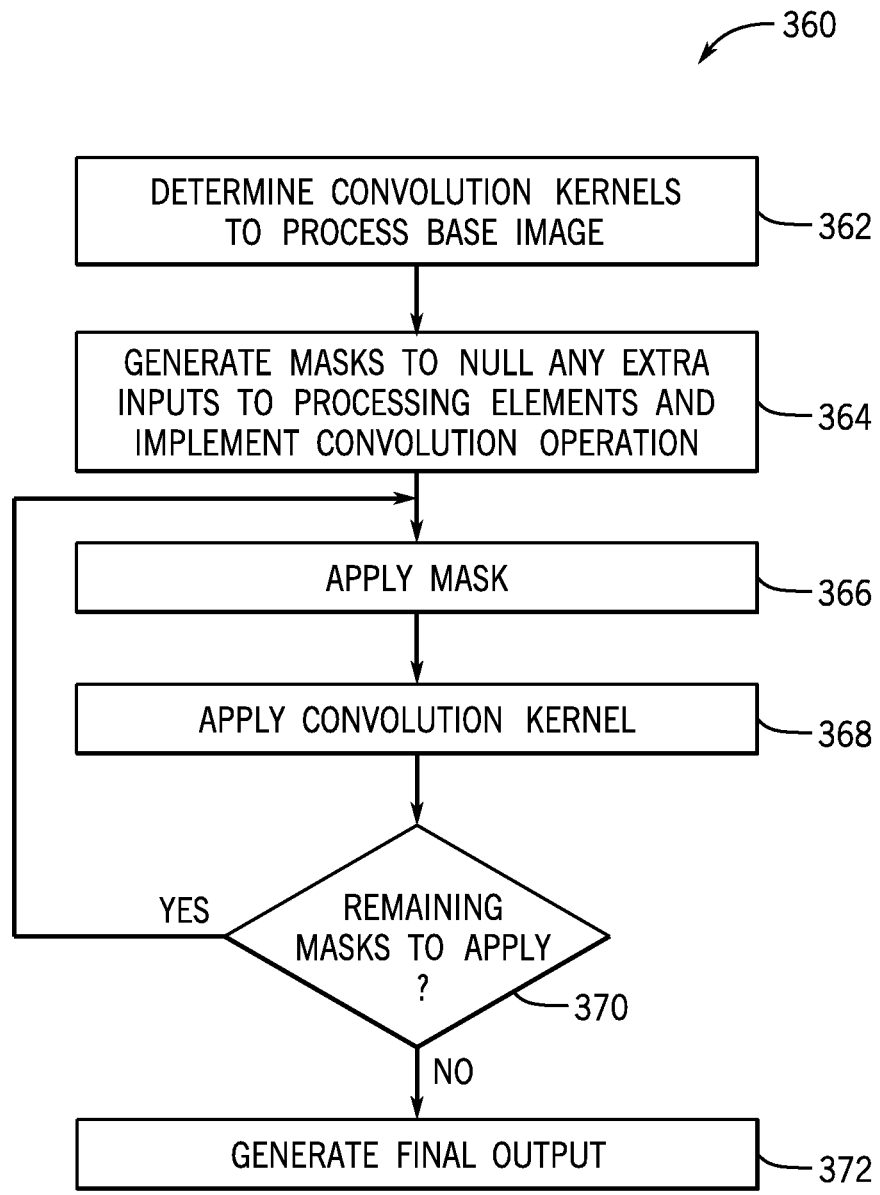
FIG. 27 is a flowchart of a process for operating the processing element of FIG. 19 to process data using a convolution operation, in accordance with an embodiment.

To help explain, FIG. 27 is a flowchart of a process 360 for operating the processing element 96 to process data received via the bus 102 using a convolution operation. The process 360 is described as performed by the first input controller 90 or second input controller 92, though it should be understood that various operations of the process 360 may be performed by components of the processing element 96 and/or by processing circuitry external to the processing element 96, in some cases. Furthermore, although described in a particular order below, it should be understood that any suitable order of operations may be used to perform the process 360.

At block 362, the first input controller 90 or second input controller 92 may determine convolution kernels 342 to process a base image 340. The base image 340 may be transmitted to target processing elements 96 via bus 102. The first input controller 90 or second input controller 92 may divide a base image 340 into portions based on a desired size of a convolution kernel 342. For ease of explanation, a 3×3 unit convolution kernel 342 is described herein to process a 5×5 unit image. When determining the convolution kernels 342 to process the base image 340, a residual number of inputs to one or more processing elements 96 may be determined. The residual number of inputs may correspond to a difference between a total number of portions of the image (e.g., units, in this case 25 units make up the base image 340) and a total number of inputs going to the one or more processing elements 96 (e.g., in this case 16*2=32 total inputs). The first input controller 90 or second input controller 92 may use this determination to determine a number of processing elements 96 to use to perform the calculation by determining a number of processing elements 96 to provide a total number of inputs that meets or exceeds the total number of portions of the base image 340 (e.g., 25 units for this example). In this example, two processing elements 96 have a total number of 32 inputs, thus 7 extra inputs are included on one processing element 96. These 7 units may be masked out of use during the convolution operation.

Figure 28A:
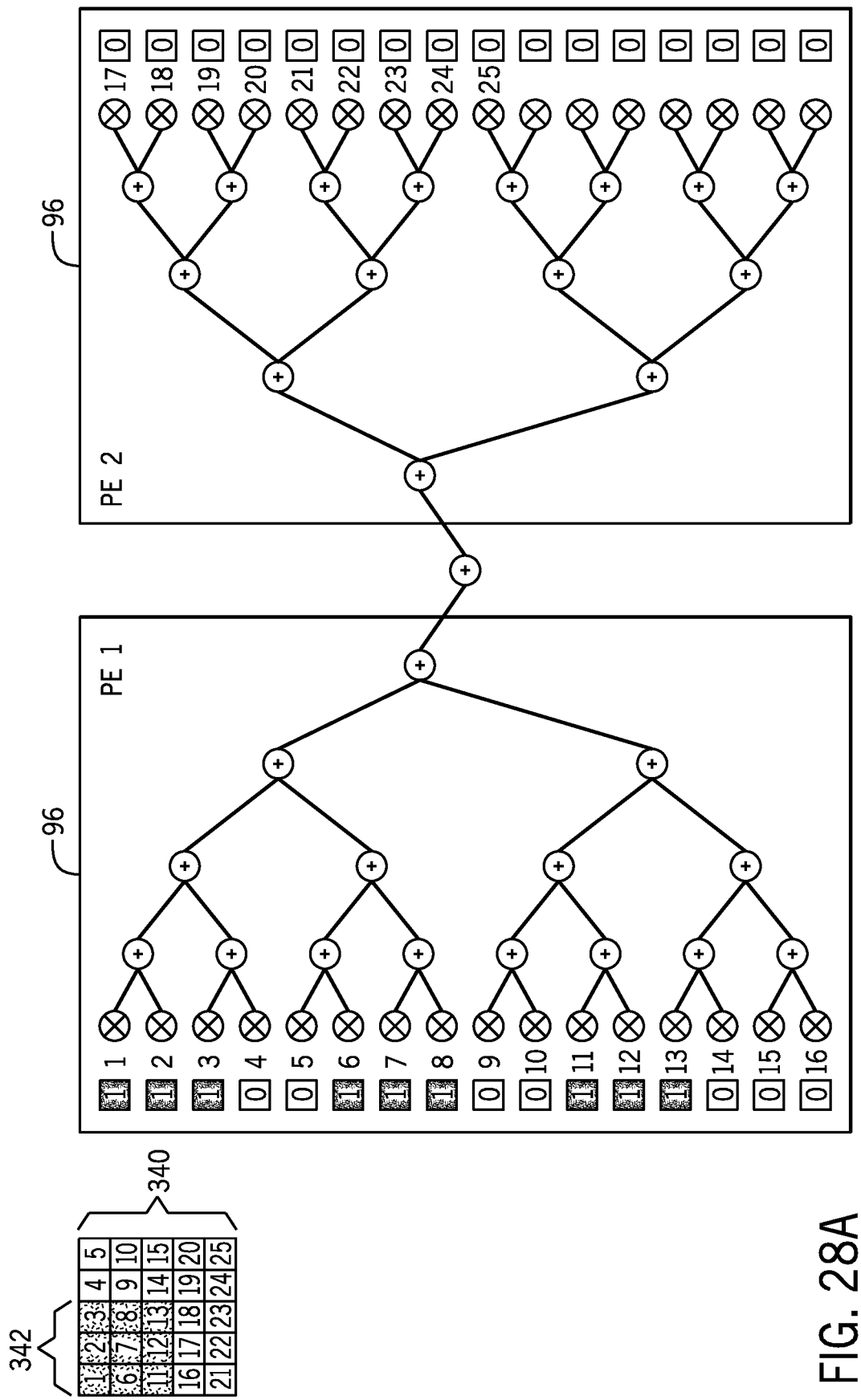
FIG. 28A is an illustration of a first convolutional mask, in accordance with an embodiment.
Figure 28B:
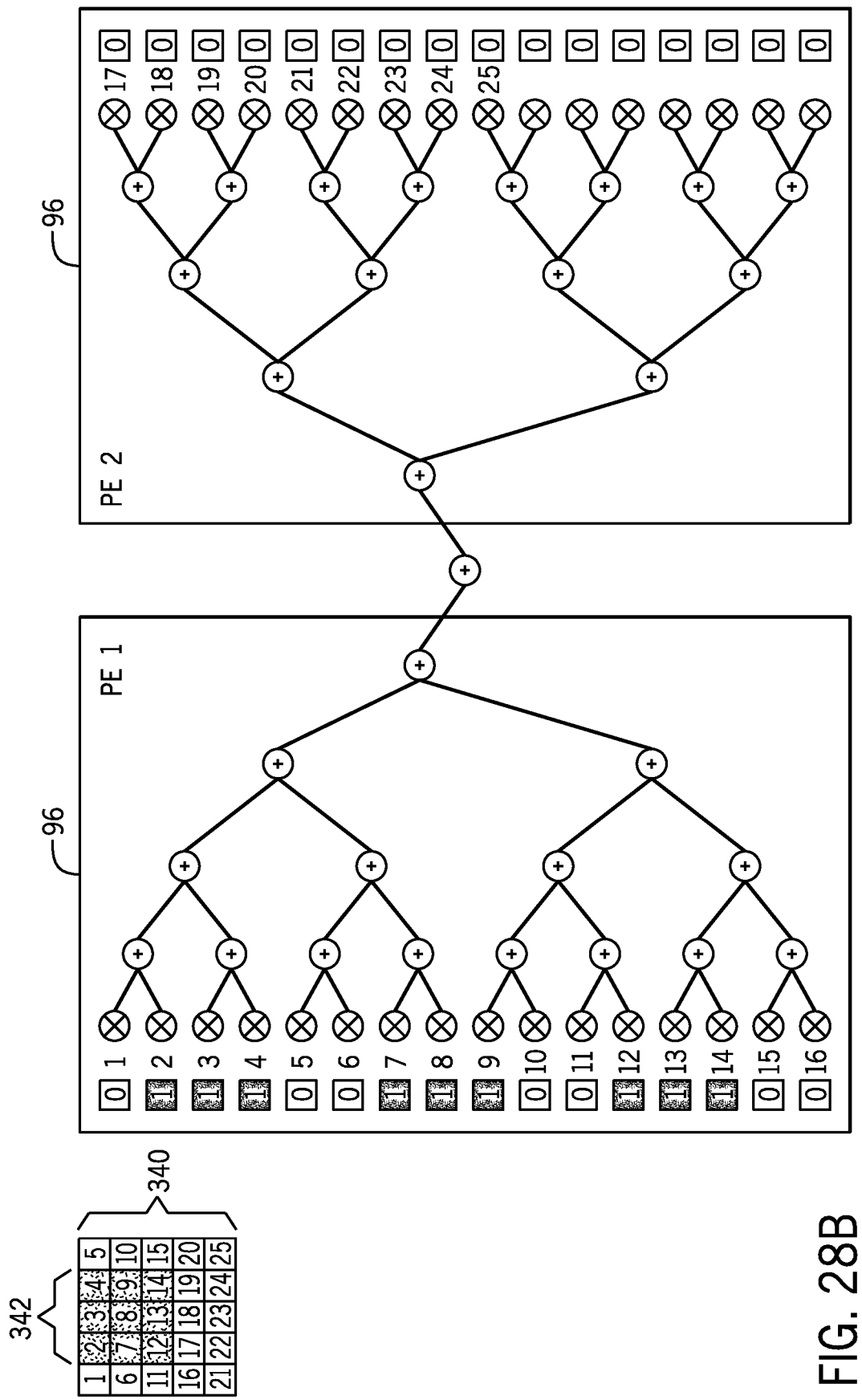
FIG. 28B is an illustration of a second convolutional mask, in accordance with an embodiment.
Figure 28C:
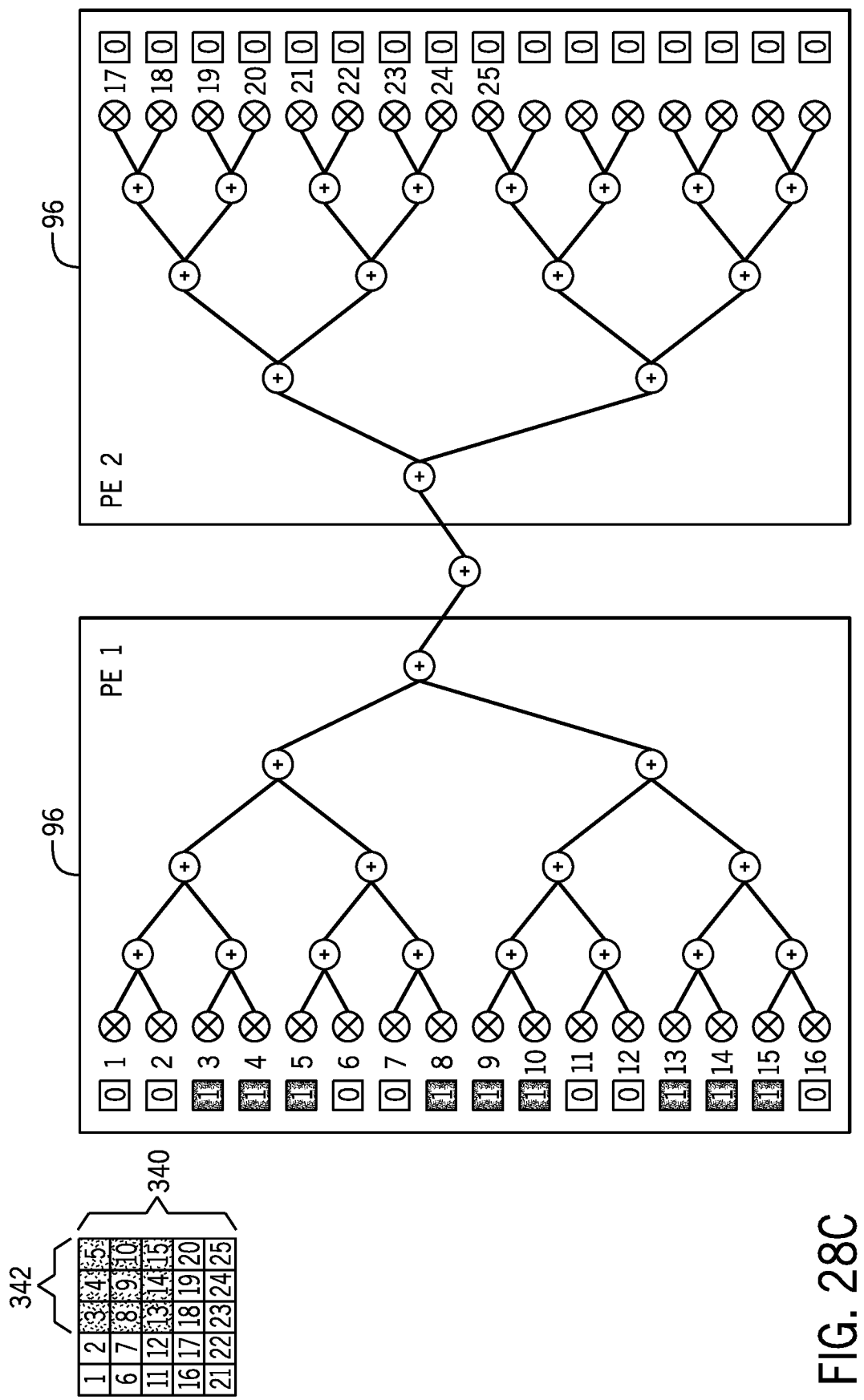
FIG. 28C is an illustration of a third convolutional mask, in accordance with an embodiment.
Figure 28D:
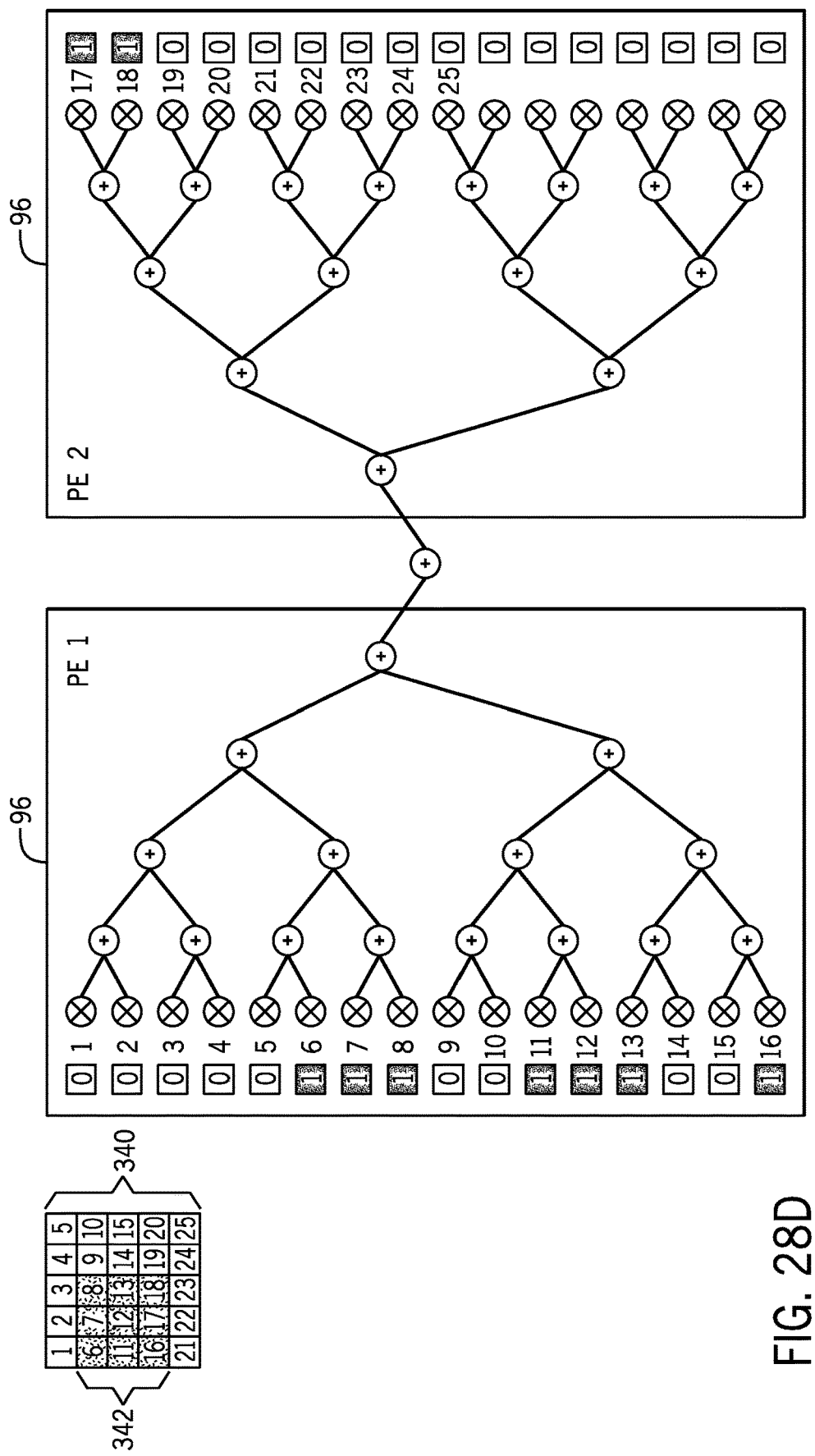
FIG. 28D is an illustration of a fourth convolutional mask, in accordance with an embodiment.

At block 364, the first input controller 90 or second input controller 92 may generate a mask to null any extra inputs to the processing elements 96 and to implement a portion of the convolution operation. In this example, the mask generated may null the 7 extra inputs to the processing elements 96 in addition to perform a portion of the convolution operation. For example, if each input were to be used, a mask equaling "1111 1111 1111 1111 1111 1111 1111 1111" may be generated. However, since seven inputs are to be nulled, the base mask to perform the convolution operations using may correspond to "1111 1111 1111 1111 1111 1111 1000 0000." When generate masks to implement portions of the convolution operation, masks may be generated for each time the convolution kernel 342 is to change relative location on the base image 340. FIG. 28A, FIG. 28B, FIG. 28C, and FIG. 28D each show a mask resulting from moving the convolution kernel 342 on the base image 340. FIG. 28A is an illustration of a first convolutional mask, FIG. 28B is an illustration of a second convolutional mask, FIG. 28C is an illustration of a third convolutional mask, and FIG. 28D is an illustration of a fourth convolutional mask.

Referring back to FIG. 27, at block 366, the first input controller 90 or second input controller 92 may apply a mask to the inputs 200 of the processing elements 96 involved with performing the convolution operation. The first input controller 90 or second input controller 92 may apply one mask at a time to the inputs 200.

Once the mask is applied to the inputs 200, at block 368, the first input controller 90 or second input controller 92 may apply a convolution kernel 342 to the base image 340 to perform the convolution processing on actual image data. In this way, image data corresponding to the different portions of the base image 340 may transmit to each input of the processing element (e.g., portion 1 of the base image may transmit to input 1 of the inputs 200, portion 2 may transmit to input 2, etc.) such that the convolution operation may apply to each portion of the base image 340.

After and/or while an output is generated and transmitted from the processing element 96, at block 370, the first input controller 90 or second input controller 92 may determine whether any remaining masks are to be applied (e.g., from any remaining of the one or more masks generated at block 364). When masks remain, the first input controller 90 or second input controller 92 may repeat operations at block 366, block 368, and block 370, until no masks remain to be applied as part of the convolution. At each repeat of block 366, the new mask applied during the subsequent operations may advance or alter a logical location of the convolution kernel 342 relative to the base image 340 to provide that each portion of the base image 340 undergoes a suitable portion of the overall convolution operation.

When, at block 370, it is determined that each mask has been applied and a suitable combination of outputs generated, at block 372, the first input controller 90 or second input controller 92 may generate a final output representative of a final convolution operation. This final output may be driven to output from the processing element 96 and/or from the integrated accumulator 66 for use in other circuitry.

Figure 29:
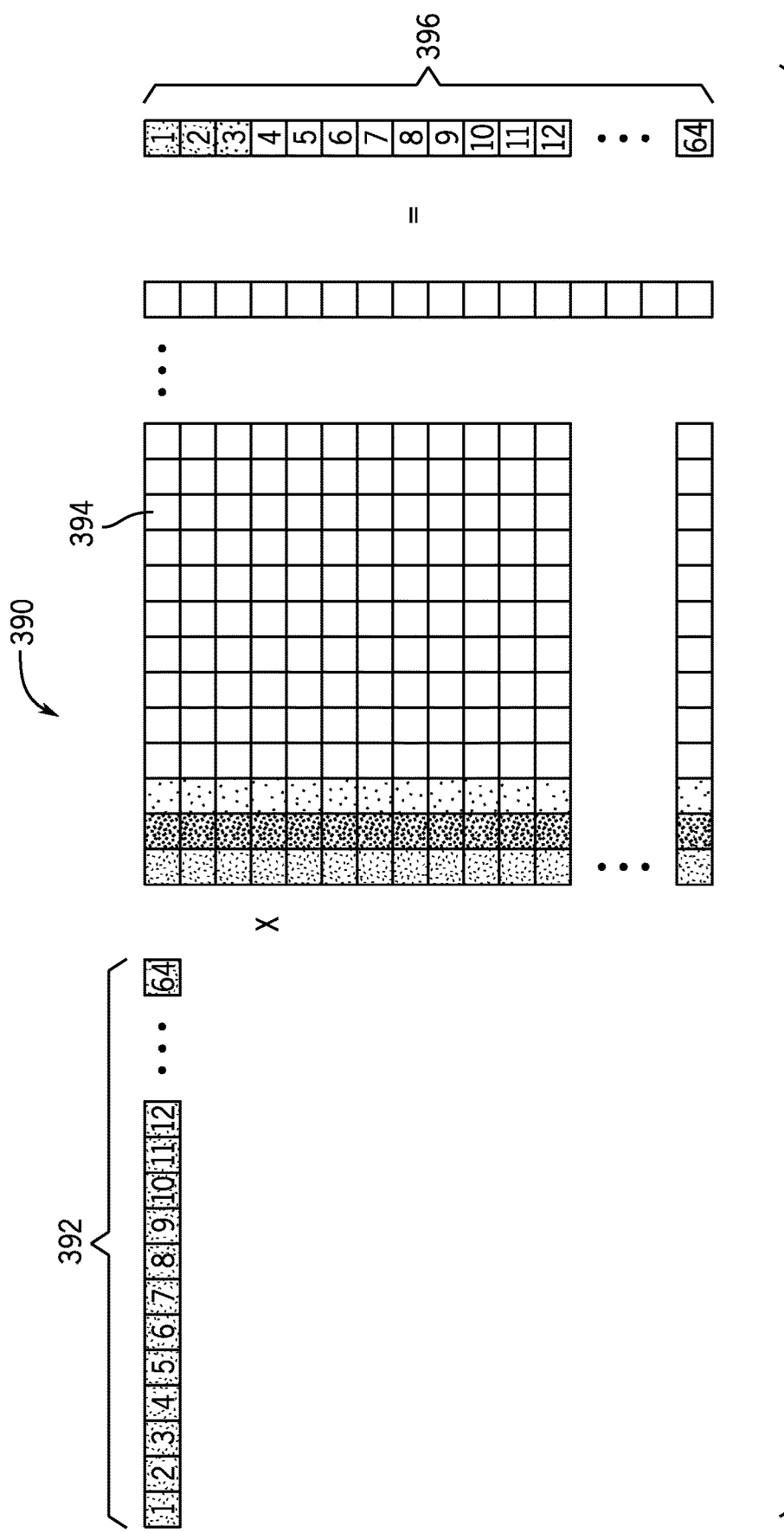
FIG. 29 is an illustration of a matrix multiplication operation as may be applied to inputs of processing elements of FIG. 19, in accordance with an embodiment.

As described above, one or more processing elements 96 may operate alone or together to perform a wide variety of operations. Yet another example of these operations is shown in FIG. 29. FIG. 29 is an illustration of a matrix multiplication operation as applied to inputs of processing elements 96.

Each processing element 96 may be able to perform up to a 16 real vector MAC operation and/or a 4 complex vector MAC operation, which may be combined in various ways to perform up to a 256 real vector MAC operation and/or a 64 complex vector MAC operation. Matrix multiplication operations may be broken up into several independent vector operations as shown in illustration 390. For example, having 64 inputs (e.g., using 4 processing elements each having 16 inputs) may permit performance of 64 parallel 64 complex vector MAC operations, such as to complete a 64×64 matrix multiplication operation performed at line clock rates (e.g., each element of vector 392 may be combined with each element of matrix 394 to generate vector 396). This capability, for example, may permit real-time beamforming operations to be performed with 64 transmitter antennas and 64 receiver antennas.

The same matrix multiplication operation may be applied to machine learning inference operations. For example, weight matrices for both the operations may be stored inside the memory 120 and/or the memory 122. The weight matrices may be pre-applied (e.g., applied prior to processing of data in compute network 124) into respective multipliers and/or adders of the compute network 124. Pre-applying weight matrices that are unchanged between operations may enable usage of the processing element 96 similar to an application specific integrated circuit (ASIC), or hardwired integrated circuit, where streaming data may be transmitted through respective compute networks 124 of respective processing elements 96 without providing respective instructions or reconfigurations between each transmission of data set and/or at each processing run time.

For machine learning training operations, partial sums and/or partial products of any given hidden layer of a data set may be stored inside the memory 120 and/or the memory 122. The partial sums and/or partial products may be retrieved at a later time by the first switchbox 264A and/or the second switchbox 264B to perform back propagation training, or any other suitable form of neural network training. In this way, in some cases, the first switchbox 264A and/or the second switchbox 264B may retrieve partial datasets from both the memory 120 and the memory 122, such that the compute network 124 processes data retrieved from both memories.

Referring back to FIG. 12 to describe additional operations, each processing element 96 may be reconfigured as shown in FIG. 12 to perform a real number MAC operation (e.g., a real vector MAC operation). This compute network 124 is shown as implementing a hybrid logarithmic and linear adder tree structure to achieve suitable accumulation to perform the real number MAC operation. The base processing of the compute network 124 has a logarithmic tree from each complex multiplier 178, and then the complex multipliers 178 are combined in a linear adder tree structure. Any added latency of the linear adder tree structure is negligible due at least in part to the systolic wave characteristics of the architecture. This depicted implementation may permit processing of relatively small matrices and relatively large matrices with a same, or substantially similar, latency. The depicted implementation may avoid accumulating partial products and may not use hardwired accumulators. Avoiding these structures may improve flexibility of the compute network 124 and enable the compute network 124 to process a wide variety of matrix sizes, such as a 1×4 matrix, 2×4 matrix, 3×4 matrix, 4×4 matrix, and so on. This flexibility is further improved since each processing element 96 may perform a 16 element real vector MAC operation. For applications using larger sizes of real or complex MAC operations, the processing elements 96 may be combined and configured into a chain using the linear adder tree (e.g., the sequentially coupled adders 308 of FIG. 21 and FIG. 22). The linear adder tree may permit variable matrix sizes to be constructed using the processing elements 96 as building blocks. It is noted that the linear adder tree, such as the multiple adders 308 coupled together in FIG. 21 and FIG. 22, may be used in combination with one or more of the techniques described herein to provide for a flexible configuration of the integrated accumulator 66.

Referring now to FIG. 13 to describe another processing operation, each processing element 96 may be reconfigured as shown in FIG. 13 to perform a complex number MAC operation (e.g., a complex vector MAC operation). Digital signal processing operations may use complex number MAC operations. Machine learning processing operations may not use complex number MAC operations. In some cases, a complex number MAC operation may be accommodated using 6 real number MAC operations, but this is accompanied with relatively larger amounts of data movement and some latency (e.g., timing costs, latency penalties). To ameliorate this, dedicated hardware paths may be included in the compute network 124 to support complex multiplication, as shown in FIG. 13. The dedicated hardware paths may permit performance of a 4 element complex vector MAC operation each clock cycle simultaneously in one or more processing elements 96. Similar to the real number MAC operation, the complex number MAC operation may be scaled to various sizes of matrices as well using one or more processing elements 96 and using the linear adder trees of FIG. 21 and FIG. 22. By having dedicated hardware as well as data buses to supply data to complex multiplier permits processing of complex data at relatively high speeds and permits processing of a 64×64 complex matrix multiplication operation each clock cycle at the line transfer rate (e.g., clocking rate of the integrated accumulator 66).

Referring now to FIG. 14, to describe another processing operation, each processing element 96 may be reconfigured as shown in FIG. 14 to perform an FFT operation (e.g., Cooley Tukey computation) using Radix-2 structural units. Each processing element 96 may perform up to 4 Radix-2 operations in parallel and the scramble network 230 may permit exchanging of data between processing elements 96. In some cases, the scramble network 230 may implement a "bottom up" approach, where processing elements 96 coupled to the far right side of the compute network 124 may be interconnected using the scramble network 230. These processing elements 96 a threshold distance (e.g., logical, physical) away from the output of the compute network 124 may perform a relatively smaller size of FFT operation when compared to processing elements 96 on the left side of the compute network 124. This structure permits performance of FFT operations at a desired (e.g., large) throughput with low latency when compared to an ASIC programmed to perform a non-configurable FFT operation.

Referring now generally to the processing element 96, in some cases, the instruction bus 262 and/or the bus 256 may include one or more data transmission lines. This may increase a bandwidth of data transmitted to the processing element 96 via these buses. As data transmission lines increase, an instruction per clock cycle metric for the integrated accumulator 66 may increase, thereby increasing a throughput of the integrated accumulator and/or reducing an amount of time used to program the integrated accumulator by a value proportional to the number of data transmission lines.

Figure 30:
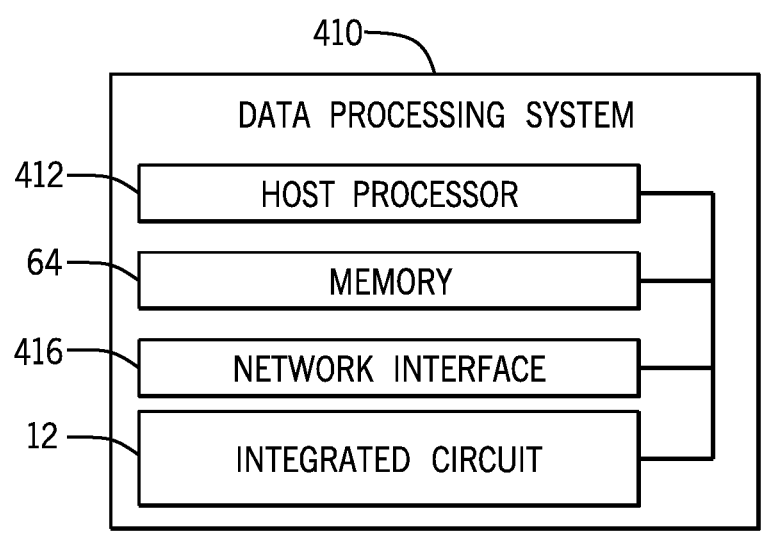
FIG. 30 is a block diagram of an example data processing system that uses the integrated circuit of FIG. 1, in accordance with an embodiment

Furthermore, it is noted that the integrated circuit 12 may be a data processing system or a component of a data processing system. For example, the integrated circuit 12 may be a component of an example application system 62, a data processing system 410, shown in FIG. 30. The data processing system 410 may include a host processor 412, memory 64, and a network interface 416. The data processing system 410 may include more or fewer components (e.g., electronic display, user interface structures, application specific integrated circuits (ASICs)). The host processor 412 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 410 (e.g., to perform encryption, decryption, machine learning, video processing, voice recognition, image recognition, data compression, database search ranking, bioinformatics, network security pattern identification, spatial navigation, or the like). The memory 64 may include random access memory (RAM), read-only memory (ROM), one or more hard drives, flash memory, or the like. The memory 64 may hold data to be processed by the data processing system 410. In some cases, the memory 64 may also store configuration programs (bitstreams) for programming the integrated circuit 12. The network interface 416 may enable the data processing system 410 to communicate with other electronic devices. The data processing system 410 may include several different packages or may be contained within a single package on a single package substrate.

In one example, the data processing system 416 may be part of a data center that processes a variety of different requests. For instance, the data processing system 410 may receive a data processing request via the network interface 416 to perform encryption, decryption, machine learning, video processing, voice recognition, image recognition, data compression, database search ranking, bioinformatics, network security pattern identification, spatial navigation, or some other specialized task. The host processor 412 may cause the programmable logic 48 fabric of the integrated circuit 12 to be programmed with circuitry suitable to implement a requested task. For instance, the host processor 412 may instruct that a configuration data (bitstream) stored on the memory 64 to be programmed into the programmable logic 48 fabric of the integrated circuit 12. The configuration data (bitstream) may represent a circuit design for performing multiplication operations that utilize one or more of the logic blocks 26, which may be mapped to the programmable logic according to the techniques described herein. As such, the integrated circuit 12 may assist the data processing system 410 in performing the requested task, such as performing multiplication operations.

The technical effects of the techniques discussed herein may provide for an integrated accumulator able to perform a wide variety of combinations of complex number MAC operations, real number MAC operations, FFT operations, and convolution operations, using a same processing element network to perform the operations. The integrated accumulator described herein uses a network of processing elements capable of performing these operations using a same underlying structure or circuit, which enables performance of a wide variety of beamforming operations, digital signal processing operations, ML/AI training and/or inference operations, FFT operations, or the like, each at a line rate with a relatively high throughput and low latency that may result in similar rates as ASIC performances but without limitations associated with an ASIC (e.g., how the ASIC is hardwired to perform one operation). This disclosure also details a scramble network that is able to interconnect processing elements in response to configuration data. The scramble network permits shuffling of inputs and outputs to respective processing elements, enabling an increase of complexity in operations supported by the integrated accumulator. The integrated accumulator may support operations having variable matrix sizes with minimal hardware overhead and relatively high utilization across each matrix size (e.g., close to 100% utilization, between 80% and 100% utilization). A linear adder tree (e.g., hybrid logarithmic and linear adder tree) may interconnect some of the processing elements, permitting efficient deployment of both small matrix operations and large matrix operations.

In some cases, the integrated accumulator may use an operational mask, which may enable performance of convolution operations without a burden of high amounts of data movement to do so. The operational mask permits the varying of a size and/or opening of the mask, enabling the integrated accumulator to a wide variety of convolutions of data, for example, up to a 14×14 convolution on data. Furthermore, a bus-based data distribution is described between PE groups (e.g., blocks of processing elements) to permit real-time and/or streaming of data between processing elements, such as to support real-time/streaming-based digital beamforming operations. Also, by using a systolic wave architecture in the integrated accumulator, low latencies (e.g., between 15 ns and 25 ns, 20 ns, approximately 20 ns) for a line rate 64×64 matrix multiplication operation may be achieved when executed at a clock frequency of 1 gigahertz (GHz), where the same hardware may be used to perform up to a 256×64 real vector matrix multiplication operation to provide real-time line rate ML inference. The integrated accumulator described herein may permit separation and/or grouping of processing elements in a wide variety of configurations using a same underlying structure (e.g., same underlying circuit). These different separations or groupings may each be able to operate in parallel, completely independent and/or based on inputs or outputs from each other, to provide a versatile processing circuit. It is noted that the integrated accumulator may also be designed such that overall power is reduced, such as to consume 210 times less energy while being 64 times faster than non-integrated matrix handling operations. Furthermore, it is noted that the integrated accumulator described herein may perform [1×256]*[256*64] 16 bit matrix multiplication in 1 clock cycle using an estimated power consumption totaling approximately 17 watts (W).

While the embodiments set forth in the present disclosure may be susceptible to various modifications and alternative forms, specific embodiments have been shown by way of example in the drawings and have been described in detail herein. For example, any suitable combination of the embodiments and/or techniques described herein may be implemented. Moreover, any suitable combination of number formats (e.g., single-precision floating-point, half-precision floating-point, bfloat16, extended precision and/or the like) may be used. Further, each DSP circuitry and/or DSP architecture may include any suitable number of elements (e.g., adders, multipliers 64, routing, and/or the like). Accordingly, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS OF THE DISCLOSURE

The following numbered clauses define certain example embodiments of the present disclosure.

CLAUSE 1.
An integrated circuit, comprising:
a first circuit;
interface circuitry; and
an integrated accumulator coupled to the first circuit through the interface circuitry, wherein the integrated accumulator comprises:
a first portion of a processing circuit configured to perform a complex number operation; and
a second portion of the processing circuit configured to perform a real number operation, and wherein the first portion of the processing circuit and the second portion of the processing circuit each comprise a plurality of multipliers and a plurality of adders.

CLAUSE 2.
The integrated circuit of clause 1, wherein the first portion of the processing circuit comprises a first compute network comprising a first subset of the plurality of multipliers and the plurality of adders arranged in a first pattern, and wherein the second portion of the processing circuit comprises a second compute network comprising a second subset of the plurality of multipliers and the plurality of adders also arranged in the first pattern.

CLAUSE 3.
The integrated circuit of clause 1, wherein a data width of data processed using the complex number operation or the real number operation is different from a data width of the interface circuitry.

CLAUSE 4.
The integrated circuit of clause 1, wherein a data width of data processed using the complex number operation or the real number operation is different from a data width of the first circuit.

CLAUSE 5.
The integrated circuit of clause 1, wherein the first portion of the processing circuit comprises multiplexing circuitry configured to route data through a multiplier of the plurality of multipliers to perform the complex number operation on the data.

CLAUSE 6.
The integrated circuit of clause 1, wherein the second portion of the processing circuit comprises multiplexing circuitry configured to route data through a multiplier of the plurality of multipliers to perform the real number operation on the data.

CLAUSE 7.
The integrated circuit of clause 1, wherein the first portion of the processing circuit is configured to perform the complex number operation at a first time and to perform an additional real number operation at a second time using a same circuit.

CLAUSE 8.
The integrated circuit of clause 1, wherein the first portion of the processing circuit is configured to perform the complex number operation at a first time and to perform a Radix-2 number operation at a second time using a same circuit.

CLAUSE 9.
The integrated circuit of clause 1, wherein the first portion of the processing circuit is configured to perform the complex number operation on a first matrix of a first size at a first time and to perform the complex number operation of a second matrix of a second size different from the first size at a second time.

CLAUSE 10.
The integrated circuit of clause 1, wherein the first portion of the processing circuit is configured to perform the complex number operation on a first matrix at a first time, wherein the second portion of the processing circuit is configured to perform the real number operation on a second matrix at the first time, wherein the first portion of the processing circuit is configured to perform the complex number operation on a third matrix at a second time, wherein the second portion of the processing circuit is configured to perform the real number operation on a fourth matrix at the second time, wherein the third matrix is larger than the first matrix, and wherein the fourth matrix is smaller than the second matrix.

CLAUSE 11.
The integrated circuit of clause 1, comprising a controller configured to operate the integrated accumulator, wherein the first portion of the processing circuit comprises an instruction decoder configured to generate and apply a configuration for the first portion of the processing circuit in response to an instruction generated by the controller to operate the integrated accumulator.

CLAUSE 12.
A method of operating a compute network of a first processing circuit to perform a complex number operation, comprising:
receiving, via the first processing circuit, an instruction from a controller;
receiving, via the first processing circuit, input data;
generating, via the first processing circuit, a configuration for the compute network in response to the instruction;
applying, via the first processing circuit, the configuration to the compute network to configure the compute network to perform the complex number operation on a first matrix in response to the configuration, wherein the compute network uses a circuit to perform the complex number operation at a first time and uses the circuit to perform a real number operation at a second time;
transmitting, via the first processing circuit, the input data through the first processing circuit to perform the complex number operation on the input data; and
outputting, via the first processing circuit, the input data to a first circuit of an integrated circuit.

CLAUSE 13.
The method of clause 12, wherein applying the configuration to the compute network comprises:
generating, via the first processing circuit, an operational mask; and
applying, via the first processing circuit, the operational mask to the compute network to deactivate a subset of inputs of the compute network from applying the input data to the complex number operation.

CLAUSE 14.
The method of clause 12, wherein applying the configuration to the compute network comprises:

configuring, via the first processing circuit, multiplexing circuitry of the compute network, wherein the multiplexing circuitry is configured to route the input data through the compute network to perform the complex number operation on the input data after application of the configuration.

CLAUSE 15.

A system, comprising:
a first circuit; and
an integrated accumulator coupled to the first circuit, wherein the integrated accumulator comprises:
  a first processing circuit comprising a compute network, wherein the first processing circuit is configured to perform a complex number operation at least in part by:
    receiving an instruction from a controller;
    receiving input data from the first circuit;
    generating a configuration for the compute network in response to the instruction;
    applying the configuration to the compute network to configure the compute network to perform the complex number operation or a real number operation on the input data in response to the configuration;
    transmitting the input data through the first processing circuit to perform the complex number operation or the real number operation on the input data; and
    outputting resulting data generated from performing the complex number operation or the real number operation on the input data.

CLAUSE 16.

The system of clause 15, wherein the integrated accumulator comprises a second processing circuit configured to perform a real number operation.

CLAUSE 17.

The system of clause 16, wherein the second processing circuit is configured to:
  receive the resulting data; and
  perform the real number operation on the resulting data.

CLAUSE 18.

The system of clause 15, wherein the compute network comprises a plurality of multipliers and a plurality of adders configured in response to the configuration, and wherein the configuration changes a relative weighting associated with at least a portion of the plurality of multipliers, a portion of the plurality of adders, or both.

CLAUSE 19.

The system of clause 15, wherein the configuration is configured to change operation of the compute network to perform the complex number operation as opposed to a real number operation or a Radix-2 operation.

CLAUSE 20.

The system of clause 15, wherein the resulting data comprises a real number and an imaginary number.

What is claimed is:

1. An integrated circuit, comprising:
a first circuit;
interface circuitry; and
an integrated accumulator coupled to the first circuit through the interface circuitry, wherein the integrated accumulator is configurable to perform a complex number operation at a first time and to perform a real number operation at a second time, wherein the integrated accumulator performs the real number operation using first real type data as an input and generates second real type data as an output, wherein the integrated accumulator comprises a plurality of multipliers and a plurality of adders, wherein the integrated accumulator has a reprogrammable data width, and wherein a data width of data processed using the complex number operation or the real number operation is different from a data width of the interface circuitry.

2. The integrated circuit of claim 1, wherein a first portion of the processing circuit comprises a first compute network comprising a first subset of the plurality of multipliers and the plurality of adders arranged in a first pattern, and wherein a second portion of the processing circuit comprises a second compute network comprising a second subset of the plurality of multipliers and the plurality of adders also arranged in the first pattern.

3. The integrated circuit of claim 1, wherein the data width of data processed using the complex number operation or the real number operation is different from a data width of the first circuit.

4. The integrated circuit of claim 1, wherein the integrated accumulator comprises multiplexing circuitry configured to route data through a multiplier of the plurality of multipliers to perform the complex number operation on the data.

5. The integrated circuit of claim 1, wherein the integrated accumulator comprises multiplexing circuitry configured to route data through a multiplier of the plurality of multipliers to perform the real number operation on the data.

6. The integrated circuit of claim 1, wherein the integrated accumulator is configured to perform the complex number operation and to perform a different complex number operation in parallel.

7. The integrated circuit of claim 1, wherein the integrated accumulator is configured to perform the complex number operation at a first time and to perform a Radix-2 number operation at a second time using a same circuit.

8. The integrated circuit of claim 1, wherein the integrated accumulator is configured to perform the complex number operation on a first matrix of a first size at a first time and to perform the complex number operation of a second matrix of a second size different from the first size at a second time without reconfiguring between the first time and the second time.

9. The integrated circuit of claim 1, wherein the integrated accumulator is configured to perform the complex number operation on a first matrix at a first time, wherein the integrated accumulator is configured to perform the real number operation on a second matrix at the first time, wherein the integrated accumulator is configured to perform the complex number operation on a third matrix at a second time, wherein the integrated accumulator is configured to perform the real number operation on a fourth matrix at the second time, wherein the third matrix is larger than the first matrix, and wherein the fourth matrix is smaller than the second matrix.

10. The integrated circuit of claim 1, comprising a controller configured to operate the integrated accumulator, wherein the integrated accumulator comprises an instruction decoder configured to generate and apply a configuration for the integrated accumulator in response to an instruction generated by the controller to operate the integrated accumulator.

11. The integrated circuit of claim 1, wherein the integrated accumulator comprises a compute network coupled to an instruction decoder, wherein the compute network comprises one or more multipliers of the plurality of multipliers and one or more adders of the plurality of adders and is configured with control signals generated by the instruction decoder to adjust a relative weighting associated with the one or more multipliers or the one or more adders.

12. A method of operating a compute network of a first processing circuit to perform a complex number operation, comprising:
   receiving, via the first processing circuit, an instruction from a controller;
   receiving, via the first processing circuit, input data;
   generating, via the first processing circuit, a configuration for the compute network in response to the instruction;
   programming, via the first processing circuit, an integrated accumulator of the compute network based on the configuration, wherein the integrated accumulator is configurable to perform the complex number operation at a first time and to perform a real number operation at a second time based on the configuration, wherein the real number operation is performed on first real type data as an input and generates second real type data as an output, wherein the integrated accumulator is configurable to perform the complex number operation on a first matrix of a first size at a first time and to perform the complex number operation of a second matrix of a second size different from the first size at a second time without reconfiguring between the first time and the second time;
   transmitting, via the first processing circuit, the input data through the first processing circuit to perform the complex number operation on the input data; and
   outputting, via the first processing circuit, the input data to a first circuit of an integrated circuit.

13. The method of claim 12, further comprising applying the configuration to the compute network by:
   generating, via the first processing circuit, an operational mask; and
   applying, via the first processing circuit, the operational mask to the compute network to deactivate a subset of inputs of the compute network from applying the input data to the complex number operation.

14. The method of claim 12, further comprising applying the configuration to the compute network by:
   configuring, via the first processing circuit, multiplexing circuitry of the compute network, wherein the multiplexing circuitry is configured to route the input data through the compute network to perform the complex number operation on the input data after application of the configuration.

15. The method of claim 12, wherein the integrated accumulator has a reprogrammable data width, and wherein a data width of data processed using the complex number operation or the real number operation is different from a data width of the interface circuitry.

16. A system, comprising:
   a first circuit; and
   an integrated accumulator coupled to the first circuit, wherein the integrated accumulator is configurable to perform one or more real number operations and one or more complex number operations, wherein the real number operation is performed on real type data as an input and generates real type data as an output, wherein the integrated accumulator comprises a compute network coupled to an instruction decoder, wherein the compute network comprises one or more multipliers and one or more adders and is configured with control signals generated by the instruction decoder to adjust a relative weighting associated with the one or more multipliers or the one or more adders, wherein the integrated accumulator is configurable to:
   receive an instruction from a controller;
   receive input data from the first circuit;
   generate a configuration for the compute network in response to the instruction;
   apply the configuration to the compute network to configure the compute network to perform a respective complex number operation, or a respective real number operation, or both on the input data in response to the configuration;
   transmit the input data through the integrated accumulator to perform the complex number operation or the real number operation on the input data; and
   output resulting data generated from performing the complex number operation, the real number operation, or both on the input data.

17. The system of claim 16, wherein the configuration is configured to change operation of the integrated accumulator to perform the complex number operation as opposed to a real number operation or a Radix-2 operation.

18. The system of claim 16, wherein the resulting data comprises a real type number and an imaginary type number.

19. The system of claim 16, further comprising a second circuit having first programmable logic, wherein the first circuit comprises second programmable logic, and wherein the integrated accumulator is configurable to receive the input data generated via the second programmable logic and to output the resulting data to the first programmable logic.

20. The system of claim 16, wherein the integrated accumulator has a reprogrammable data width, and wherein a data width of data processed using the complex number operation or the real number operation is different from a data width of the interface circuitry.

* * * * *